(12) United States Patent
Behnke et al.

(10) Patent No.: US 11,123,976 B2
(45) Date of Patent: Sep. 21, 2021

(54) DEVICE FOR PRINTING ON HOLLOW ARTICLES

(71) Applicant: KOENIG & BAUER AG, Würzburg (DE)

(72) Inventors: Stephan Behnke, Ahrensfelde (DE); Kurt Weschenfelder, Zell am Main (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/051,452

(22) PCT Filed: Aug. 12, 2019

(86) PCT No.: PCT/EP2019/071584
§ 371 (c)(1),
(2) Date: Oct. 29, 2020

(87) PCT Pub. No.: WO2020/048739
PCT Pub. Date: Mar. 12, 2020

(65) Prior Publication Data
US 2021/0094273 A1    Apr. 1, 2021

(30) Foreign Application Priority Data

Sep. 4, 2018   (DE) ..................... 10 2018 121 542.8

(51) Int. Cl.
*B41F 17/22*   (2006.01)
*B41F 17/00*   (2006.01)
(Continued)

(52) U.S. Cl.
CPC ............ *B41F 17/22* (2013.01); *B41F 17/002* (2013.01); *B65G 47/846* (2013.01); *B65G 47/91* (2013.01);
(Continued)

(58) Field of Classification Search
CPC ........................................ B41F 17/22
(Continued)

(56) References Cited

U.S. PATENT DOCUMENTS 4,245,583 A   1/1981   Schollkopf et al.
4,573,407 A   3/1986   Jeschke
(Continued)

FOREIGN PATENT DOCUMENTS

DE   1811356 A1   6/1970
DE   2851426 A1   6/1979
(Continued)

OTHER PUBLICATIONS

International Search Report of PCT/EP2019/071584 dated Oct. 29, 2019.

*Primary Examiner* — Anthony H Nguyen
(74) *Attorney, Agent, or Firm* — Mattingly & Malur, PC

(57) ABSTRACT

A device for printing on hollow articles comprises a segmented wheel and an apparatus for sequentially supplying the hollow articles to the periphery of the segmented wheel. The apparatus comprises at least a conveyor wheel and a mandrel wheel, arranged in the transport direction of the hollow articles, with first the conveyor wheel, then the mandrel wheel and thereafter the segmented wheel being arranged. A plurality of driver elements are on the periphery of the conveyor wheel, and a plurality of retaining apparatuses are arranged on the periphery of the mandrel wheel. Each retaining apparatus is provided for receiving a hollow article, which is to be printed on in cooperation with the segmented wheel. The conveyor wheel has a suction apparatus for suctioning each hollow article to be supplied to the segmented wheel. The suction apparatus has a suction pump which is switched on or off in dependence on an angular position of the conveyor wheel. When the suction pump is switched on, it produces a negative pressure. A hollow
(Continued)

article, which is to be conveyed to the mandrel wheel by the conveyor wheel and which is arranged on one of the driver elements of the conveyor wheel, is retained on the particular driver element of the conveyor wheel by the negative pressure, in an angular range of the rotating conveyor wheel.

14 Claims, 22 Drawing Sheets

(51) Int. Cl.
*B65G 47/84* (2006.01)
*B65G 47/91* (2006.01)
(52) U.S. Cl.
CPC .. *B41P 2217/62* (2013.01); *B65G 2201/0244* (2013.01)
(58) Field of Classification Search
USPC ........................................................ 101/38.1
See application file for complete search history.

(56) References Cited

U.S. PATENT DOCUMENTS

| | | | |
|---|---|---|---|
| 5,111,747 A | 5/1992 | Kobler et al. | |
| 5,970,865 A * | 10/1999 | Horth | B41F 17/22 101/40 |
| 6,095,045 A | 8/2000 | Petersen et al. | |
| 6,811,648 B1 * | 11/2004 | Dominico | B65C 3/06 101/38.1 |
| 6,880,457 B2 * | 4/2005 | Roesch | B41F 17/22 101/36 |
| 2001/0004918 A1 * | 6/2001 | Hansch | B42C 1/10 156/300 |
| 2001/0025572 A1 * | 10/2001 | Aichele | B41F 17/22 101/35 |
| 2001/0039889 A1 | 11/2001 | Ackley | |
| 2005/0045053 A1 * | 3/2005 | Finan | B41J 3/4073 101/38.1 |
| 2005/0062212 A1 * | 3/2005 | Jensen | B41J 13/226 271/97 |
| 2010/0282402 A1 | 11/2010 | Demange et al. | |
| 2010/0313771 A1 | 12/2010 | Ferrari et al. | |
| 2011/0162542 A1 * | 7/2011 | Nakamura | B41M 1/04 101/38.1 |
| 2012/0017783 A1 * | 1/2012 | Uptergrove | B41F 17/18 101/38.1 |
| 2014/0049585 A1 * | 2/2014 | Tashiro | B41F 17/22 347/102 |
| 2015/0336750 A1 * | 11/2015 | Coates | B65G 37/00 198/601 |
| 2018/0186492 A1 * | 7/2018 | Kronseder | B65C 9/2265 |

FOREIGN PATENT DOCUMENTS

| | | |
|---|---|---|
| DE | 3232780 A1 | 5/1983 |
| DE | 8912194 U1 | 11/1989 |
| DE | 19624440 A1 | 1/1998 |
| DE | 10160734 A1 | 7/2002 |
| DE | 102006004568 A1 | 8/2007 |
| DE | 102006048286 A1 | 4/2008 |
| DE | 102007052761 A1 | 5/2008 |
| EP | 1132207 A1 | 9/2001 |
| EP | 2562103 A1 | 2/2013 |
| WO | 2004/109581 A2 | 12/2004 |
| WO | 2012/148576 A1 | 11/2012 |
| WO | 2018/013465 A1 | 1/2018 |

\* cited by examiner

DEVICE FOR PRINTING ON HOLLOW ARTICLES

CROSS-REFERENCE TO RELATED APPLICATIONS

This application is the U.S. National Phase, under 35 U.S.C. § 371, of PCT/EP2019/071584, filed Aug. 12, 2019; published as WO 2020/048739 A1 on Mar. 12, 2020 and claiming priority to DE 10 2018 121 542.8, filed Sep. 4, 2018, the disclosures of which are expressly incorporated herein in their entireties by reference.

FIELD OF THE INVENTION

The present invention relates to a device for printing on hollow bodies. The device comprises a segmented wheel and an apparatus sequentially feeding the hollow bodies to the circumference of the segmented wheel. The feeding apparatus has at least a conveyor wheel and a mandrel wheel. Arranged in the direction of transport of the hollow bodies are the conveyer wheel, followed by the mandrel wheel and followed thereafter by the segmented wheel. A plurality of carrier elements are arranged on the circumference of the conveyor wheel and a plurality of holding devices, each for receiving one hollow body at a time to be printed on, in cooperation with the segmented wheel, are arranged on the circumference on the mandrel wheel.

BACKGROUND OF THE INVENTION

As is known from WO 2012/148576 A1, for example, in a device used in the packaging industry for decorating hollow bodies, each of which has a cylindrical lateral surface, in most cases a plurality of printing units are used. In such cases, each of these printing units transfers a printing ink onto a printing blanket, which is used jointly by these printing units. The lateral surface of the hollow body in question is then decorated with a print motif, e.g. a multicolored print motif, by a relative movement between the lateral surface of the hollow body in question and the printing blanket, in particular by rolling the lateral surface of the hollow body in question along said printing blanket, which has been inked-up in advance, in particular with multiple colors.

A device of this type for printing on or for decorating hollow bodies, each of which has in particular a preferably cylindrical lateral surface, is used, e.g., in conjunction with a production system for the manufacturing and further processing of such hollow bodies which typically has a plurality of work stations, wherein the hollow bodies are printed on or decorated by means of a printing process, and therefore these hollow bodies may also be referred to generally as printed products. In such a production system, the hollow bodies to be printed on are produced in a large-scale production process in which, e.g., several hundred or even several thousand pieces are produced per minute, e.g., between 1500 and 2500 pieces per minute, particularly preferably between 1800 and 2200 pieces per minute. Hollow bodies of this type are made of metal, in particular steel or aluminum, for example, or are made of plastic. Metal hollow bodies of this type are used, e.g., as beverage cans or as aerosol cans. Plastic hollow bodies of this type are produced, e.g. in the form of thermoplastic molded articles and are used, e.g. as cartons for packaging liquid or paste-like food products, for example, especially dairy products or beverages. However, the respective hollow body may also be a round tubular body made of either a plastic or aluminum, with a tube being defined as an elongated, sturdy but malleable container, which is intended for filling particularly with a paste-like substance. Tubes made of aluminum are produced, e.g. in a backward extrusion process. Tubes made of plastic are produced as seamless tubes, e.g. by means of extrusion. Another possible type of hollow body that can be printed on in a device as described above is containers or vessels, such as bottles or flasks, preferably cylindrical and made of glass.

Beverage cans are preferably made of aluminum and are typically what are known as two-part cans, in which a circular base together with a preferably straight cylinder shell are produced from of a single work piece, i.e. from a slug or from a blank, i.e. a circular disk, in a forming process, for example in a cold extrusion process or in a tensile-pressure forming process, preferably by deep drawing, in particular by deep drawing and ironing, to form a hollow body which is open at one end, known as a can blank, and in which, in a manufacturing step carried out at the end of the production process, a circular lid is placed on the cylinder and is attached to the cylinder by flanging, forming an air-tight seal.

Tinplate cans are another type of can. Tinplate is tin-plated sheet steel. The thickness of the sheet steel used to produce tinplate cans is 0.15 mm to 0.49 mm, for example, and the thickness of the tin plating is 0.2 μm to 0.8 μm, for example; the tin plating provides protection against corrosion. Tinplate cans are what are known as three-part cans. To produce the shell for a tinplate can, a rectangular strip of sheet steel is bent into a preferably straight cylinder, and the ends of this strip that has been bent into a cylinder are welded together at a butt joint. A circular base and a circular lid are then placed onto the cylinder and the edges are flanged. To make the tinplate can in question more resistant to dents, each of the three parts, i.e., the cylinder shell, the base and the lid, preferably has a corrugated profile, for example.

An aerosol can, also called a spray can, is a metal can used for spraying liquids. The liquid filled into an aerosol can is pressurized, and propane, butane, dimethyl ether or mixtures thereof, or compressed air or nitrogen, for example, is used as the propellant for dispensing the liquid from the can.

The aforementioned WO 2012/148576 A1 describes a device for decorating cans, in which an arrangement of multiple printing units is provided, each having an inking unit for the multicolored decoration of a multiplicity of cans. Each of the inking units belonging to one of said printing units has an ink fountain for supplying printing ink, with an ink fountain roller for receiving the printing ink from the relevant ink fountain being provided in each ink fountain. In each inking unit a ductor roller is provided, each ductor roller receiving printing ink from the relevant ink fountain roller, and in a roller train that follows the respective ductor roller in the relevant inking unit, multiple oscillating inking rollers and multiple ink transfer rollers are provided, each of which cooperates with at least one of the ink distribution rollers. For each inking unit, a plate cylinder having at least one printing plate is provided, with only a single inking roller cooperating with each respective plate cylinder to apply the printing ink.

From U.S. Pat. No. 4,741,266 A, a device for decorating cans is known, which has multiple inking stations and plate cylinder devices, wherein each of the plate cylinder devices is driven separately by a main gear unit, and wherein the main gear unit is associated with a print roller device, making said main gear unit completely independent of the roller drive system of each inking station.

From WO 2018/015 134 A1 a device for decorating hollow bodies is known, having at least one plate cylinder and having an inking unit, configured in particular as a short inking unit, with an inking roller that is or at least can be thrown onto the relevant plate cylinder, along with an anilox roller that is or at least can be thrown onto the inking roller, wherein the inking roller and the anilox roller each have their own separate drive for their respective rotation. The plate cylinder, a rubber blanket cylinder that cooperates with said cylinder, and an impression cylinder likewise each have their own separate drive for their respective rotation. The respective rotational speeds of plate cylinder, rubber blanket cylinder, impression cylinder, inking roller, and anilox roller are synchronized with one another in terms of control technology.

WO 2004/109581 A2 discloses an apparatus for carrying out a contactless digital printing method, e.g. an inkjet printing method, for printing on round objects, in particular two-part cans, individually if necessary, without the use of a printing blanket, in which a plurality of print heads are preferably provided, each of which prints in a single printing ink.

From DE 10 2006 004 568 A1 a short inking unit for a printing press is known, comprising a printing forme cylinder, an inking roller cooperating with the printing forme cylinder, and an anilox roller that contacts the inking roller and is associated with a device for supplying ink, wherein at least one leveling roller is disposed between the point where ink is supplied and the contact nip between the anilox roller and the inking roller in relation to the direction of rotation of the anilox roller, and the device for supplying ink is embodied as a chamber doctor blade.

Known from DE 101 60 734 A1 is a printing press that comprises at least one printing forme, a dampening unit for dampening the printing forme with a dampening medium, an inking unit for inking up the printing forme with a printing ink, and a dehumidifying device with a heating roller (temperature control roller) for reducing the amount of dampening medium that is conveyed together with the printing ink, wherein the inking unit is embodied as a leverless short inking unit, wherein one inking unit roller of the inking unit includes a first rolling contact point at which the inking unit roller is in rolling contact with the heating roller, wherein the inking unit roller has a second rolling contact point, and wherein the shortest path along which printing ink is conveyed from the inking unit roller to the printing forme is determined by at most one intermediate roller.

From DE 32 32 780 A1 an inking unit for offset printing presses for printing sheets or webs is known, which has a plate cylinder that receives the necessary ink from no more than two inking rollers, which have an elastic surface and which cooperate with an inking cylinder to which the ink is supplied via an ink supply system that produces a continuous ink film, wherein an inking roller having nearly the same diameter as the plate cylinder is disposed downstream of the inking cylinder, wherein the inking cylinder is associated with a dampening unit having at least one roller for transferring the dampening medium, and wherein the dampening medium is transferred to the inking cylinder in the direction of rotation thereof downstream of the ink application and upstream of the contact point thereof with the inking roller.

Known from DE 10 2006 048 286 A1 is a method for driving a printing unit that has a short inking unit in a processing machine that has an anilox roller and an associated doctor blade device, along with an inking roller located downstream of the anilox roller, and a plate/forme cylinder downstream of the inking roller in the direction of ink flow, wherein the plate/forme cylinder is operatively connected to a rubber blanket cylinder and the rubber blanket cylinder is operatively connected to a printing cylinder that guides the printing substrate, wherein the anilox roller is driven by an independent drive, wherein during printing/coating operation, the main drive supplies an input drive to a drive wheel of the printing cylinder and to a drive wheel of the rubber blanket cylinder and to a second and a first drive wheel of the plate/forme cylinder and to a drive wheel of the inking roller and to a drive wheel of the anilox roller, wherein the independent drive of the anilox roller is inactive, and wherein during makeready operation, the drive connection to the main drive between first drive wheel and second drive wheel of the plate/forme cylinder is disconnected, the independent drive of the anilox roller is activated, and the independent drive applies drive torque to the drive wheel of the anilox roller and to the drive wheel of the inking roller and to the first drive wheel of the plate/forme cylinder.

From DE 196 24 440 A1, a device for filling depressions in a cylinder of a printing press with a fluid is known, wherein at least two doctor blade devices for filling depressions in the cylinder with the fluid are arranged on the cylinder, wherein an application means for the fluid, connected to a fluid conveyance system, and a working doctor blade disposed downstream of said application means in the direction of rotation of the cylinder are provided, wherein the doctor blades are mounted on a bar, and the wiped-off fluid is discharged to a collecting trough.

Known from DE 89 12 194 U1 is an inking unit for use in a printing press, having a working doctor blade that can be engaged against an anilox roller, along with an ink trough with ink conveying means, wherein the working doctor blade, the ink trough and the means for conveying the ink to the anilox roller are combined to form a single modular unit and the modular unit can be removably attached to a carrier structure mounted on the printing press.

Known from DE 10 2007 052761 A1 is an anilox printing unit, which includes an inking roller and an anilox roller as inking unit rollers, the anilox roller being mounted on rocking levers, wherein the anilox roller and the inking roller each have bearer rings, and a device for pressing the bearer rings of one inking unit roller against the bearer rings of the other inking unit roller includes springs to compensate for diameter differences resulting from manufacturing tolerances.

Known from DE 28 51 426 A1 is a device for printing on the lateral surface of hollow bodies, wherein a transport device is provided for transporting the hollow bodies to be imprinted about a rotational axis, wherein a plurality of printing units are provided, wherein each hollow body to be printed on can be transported by means of the transport device into the printing zone of at least one of the printing units, and wherein at least one of the printing units has a printing forme cylinder and an inking unit having a single inking roller.

From US 2010/0282402 A1, it is known to use a torque motor in a marking or labeling machine.

From US 2010/0313771 A1 a rotary printing press for printing on containers is known, in which a chuck-bearing carousel is provided, the carousel being rotationally driven by an electric motor with an integrated rotary encoder.

From DE 18 11 356 A1, a machine for the printing, coating, filling, labeling, etc. of tubes, sleeves, or tubular workpieces in a continuous workflow is known, which consists of multiple series-connected processing groups, which are connected to one another by a continuous conveyor chain and at least one processing group of which has a revolver head as a workpiece carrier, which carries the workpieces placed onto holder spindles and, as it advances in incremental movement, presents said workpieces in succession to the tool, wherein as the workpieces arrive at the conveyor chain they are placed on the holder spindles with the aid of a placement and transport device, wherein the transport and push-on device has a push-on element, which, in a coaxial alignment with the holder spindle of the workpiece carrier that is to be loaded, executes an axial back-and-forth pushing movement toward the workpiece carrier and away from the same, in synchronization with the advancing movement of the workpiece carrier, and has a transport roller having receptacles for the workpieces distributed along its circumference, which roller is rotatable about a central rotational axis that extends parallel to the axis of the workpiece carrier and thereby executes, in synchronization with the switching movement of the workpiece carrier, an incremental advancing movement about its rotational axis, said roller receiving in succession, as it advances in incremental movement, the workpieces coming from the conveyor chain and presenting them individually, in coaxial alignment with the holder spindle that is to be loaded, to the push-on element, which pushes them onto the corresponding holder spindle, wherein the transport roller is assigned a pneumatic suction device, which, as the workpiece carrier advances in incremental movement, generates a selectively adjustable vacuum within the receptacle that faces the transport belt.

From EP 2 562 103 A1, a transfer device having a mandrel wheel and a transfer wheel is known, which are driven in rotation about mutually parallel rotational axes, and which each have holders in the region of their periphery for objects to be printed or otherwise processed, wherein the distance of the holders on the mandrel wheel from the rotational axis of the mandrel wheel is adjustable between a minimum distance and a maximum distance, and mandrel wheel and transfer wheel are arranged adjacent to one another in such a way that objects can be transferred from a transport device via the transfer wheel to one holder each on the mandrel wheel, or conversely can be transferred from the mandrel wheel via the transfer wheel to a transport device, wherein the holders on the transfer wheel are mounted pivotably about a pivot axis, each via a transfer pivot arm, wherein the pivot axis extends parallel to the rotational axis of the transfer wheel and the pivot axis has the same fixed distance from the rotational axis for each of the holders.

Known from EP 1 132 207 A1 is a transfer device for hollow bodies, such as sleeves, collapsible tubes, cans, or the like, that have been or are to be printed on in a printing press, in which a transfer rotor having holding units arranged one after the other in the direction of rotation is provided, the holding units defining receiving sites for releasably holding the hollow bodies to be transferred, wherein the holding units comprise vacuum holding means for retaining the hollow bodies during the transfer process.

From US 2001/0039889 A1 a device for rotary printing is known, comprising: a) a conveyor belt containing a plurality of pockets that receive a plurality of pellet-shaped articles such as capsules and caplets; b) a printing roller spaced from the conveyor belt by a predefined or relative distance, which, in contact with each of the pellet-shaped articles, prints a strip of indicia that encompass a range from 0° to 360° of the circumference of each pellet-shaped article; and c) means for adjusting the predefined or relative distance between the printing roller and the conveyor belt to vary the length of the strip of indicia printed onto the pellet-shaped articles.

From US 2015/0336750 A1 an infeed device for feeding can bodies to a can body decorating device is known, the infeed device comprising: a) a conveyor, which transports can bodies from an upstream supply; b) a rotatable mandrel wheel, receives each can body in a pocket on the circumference of the wheel, the can bodies being supplied undecorated; c) wherein the device comprises one or more turrets having a circular pitch; d) a separating turret, which separates each can body received from the conveyor, whereby linear can pitch on the conveyor is changed to a circular can pitch on the infeed turret(s); e) wherein the device is characterized by a transfer turret for transferring can bodies to the mandrel wheel and by a circular pitch, which corresponds to that of the mandrel wheel, whereby the can stability is improved for loading and whereby the can pitch between the conveyor and the mandrel wheel is changed in one or more stages.

From WO 2018/013465 A1 a decorator having a mandrel wheel, a segmented wheel, a transfer wheel, and a transport chain is known, wherein the mandrel wheel, the segmented wheel, the transfer wheel, and the transport chain each have a motor and a decoder, and wherein a controller is provided, the controller adapting or adjusting the respective speed of the mandrel wheel, the segmented wheel, the transfer wheel, and the transport chain based on information received from the decoders.

SUMMARY OF THE INVENTION

The object of the invention is to create a device for printing on hollow bodies, with which a high positioning accuracy of a conveyor wheel involved in the transport of the hollow bodies enables a precise transfer of the hollow bodies that are to be printed from the conveyor wheel to a mandrel wheel cooperating with said conveyor wheel to be achieved.

The object is achieved according to the invention by the provision of the conveyor wheel having a suction device for applying suction to each respective hollow body to be fed to the segmented wheel. The suction device of the suction pump which is switched on or switched off by a central control unit, based on an angular position of the conveyer wheel. When the suction pump is switched on, it generates a vacuum. A hollow body, that is arranged at one of the carrier elements of the conveyer wheel, and that is to be conveyed by the conveyer wheel to the mandrel wheel, is held at the relevant carrier element of the conveyor wheel by the vacuum, within an angular range of the rotating conveyor wheel.

BRIEF DESCRIPTION OF THE DRAWINGS

An exemplary embodiment of the invention is illustrated in the set of drawings and will be described in greater detail below. Advantages to be achieved with the invention will be mentioned in connection with the exemplary embodiment.

In the drawings.

Figure 1:
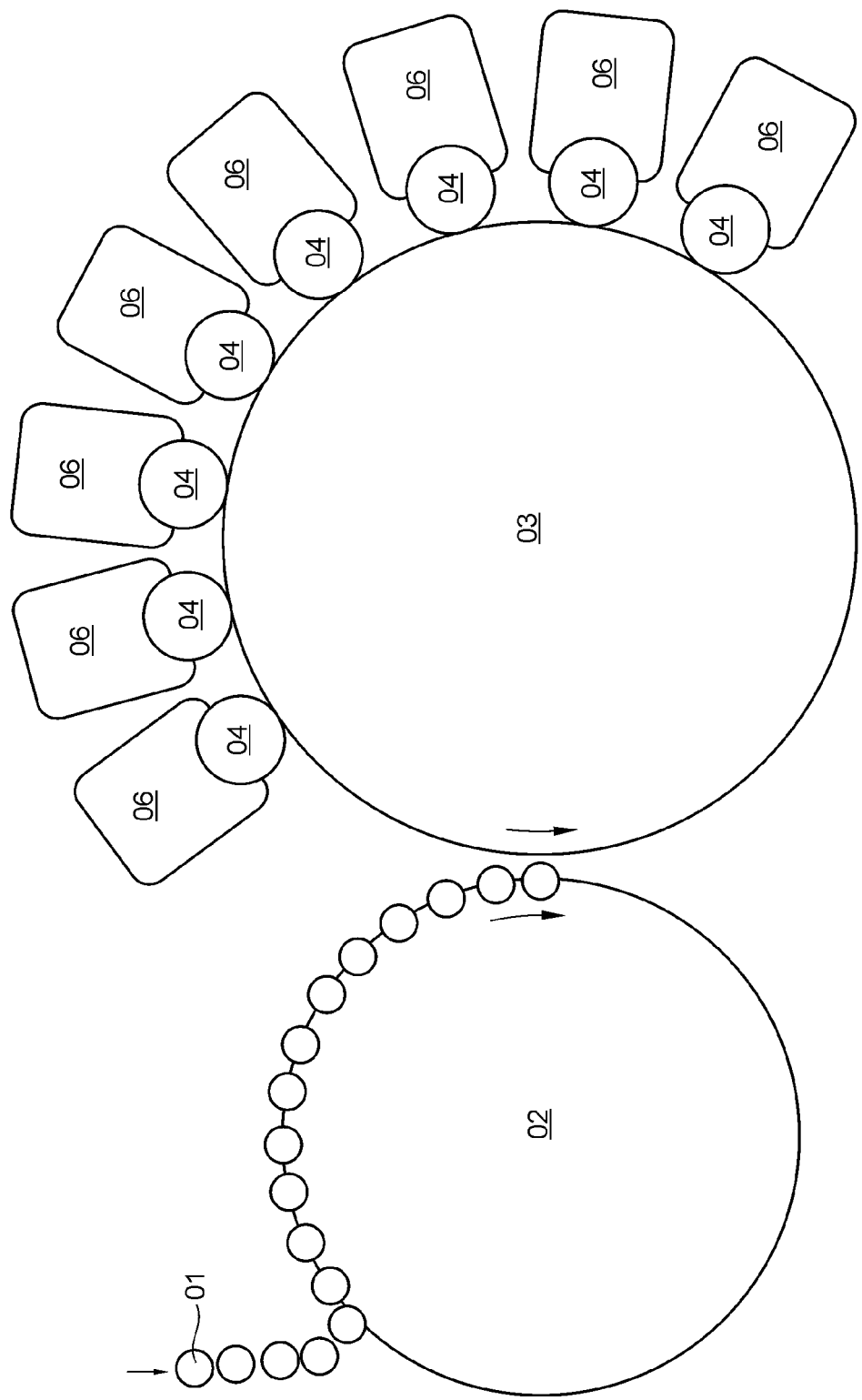
FIG. 1 shows a device for printing on or for decorating hollow bodies, each of which has a lateral surface.

In a preferred embodiment, the printing, in particular, of the lateral surface of a hollow body with, e.g. a multicolor print motif, i.e. at least one print image, is carried out in a letterpress process. Alternative or additional printing methods include, e.g., a screen printing process or an offset printing process or a forme-less digital printing process. In the following, the invention is described by way of example in conjunction with an indirect letterpress printing process in which printing ink is first applied to a printing blanket and from there onto the outer surface of a hollow body. To carry out this particular letterpress process, a printing forme in the form of a printing cliche is arranged on the lateral surface of a plate cylinder; for that reason, said cylinder is also sometimes referred to as a cliche cylinder, in particular when the printing cliche is or will be arranged, e.g., on a sleeve that is pulled onto the cylinder. The more general term "printing forme cylinder" that is otherwise used generally includes both embodiments, i.e. the traditional embodiment as a plate cylinder and the embodiment as a "cliche cylinder". The printing cliche that is ready for use in the printing process is a printing forme with a print relief, wherein, in contrast to the traditional, i.e. direct letterpress process, said print relief reproduces the print image intended for use in the indirect letterpress printing process not in a mirror image, and in an error-free print operation, only the print relief is involved in transferring the printing ink that has been supplied by the inking unit to the plate cylinder onto at least one printing blanket cooperating with said plate cylinder. The printing forme or the printing cliche to be pulled onto the plate cylinder has a plate-shaped, preferably flexible substrate of finite length, e.g. made from a steel sheet, wherein a printing element, in particular flexible, is arranged on said substrate. At least the opposite ends of the substrate in the circumferential direction of the plate cylinder may be either pre-curved, e.g. corresponding to the curvature of the lateral surface of the plate cylinder, or bent, to enable easier mounting of the printing forme, i.e. here in particular the printing cliche, on the plate cylinder. The substrate of the printing forme or the printing cliche has a thickness ranging from 0.2 mm to 0.3 mm, for example. The total thickness of the printing cliche, including its substrate, ranges from 0.7 mm to 1.0 mm, for example, and is preferably about 0.8 mm. The printing element is made, e.g., of a plastic. To produce the printing cliche that is ready for use in the printing process, the printing element is exposed, e.g. with a negative film that reproduces the print image, and unexposed areas are then removed from the printing element, e.g. by washing or by means of a laser.

A device for printing on or decorating hollow bodies, each of which has in particular a preferably cylindrical lateral surface, preferably has a plurality of printing units, e.g. eight or ten or even more, also called printing stations, wherein at least one of these printing units, and in the preferred embodiment each of these printing units, has a rotatable printing forme cylinder, in particular a printing forme cylinder configured as a plate cylinder. The printing units or printing stations and optionally also the printing forme cylinders in this device are each mounted in a frame and can be used in the same printing process to produce a print motif in multiple inks on the same hollow body, the number of inks corresponding to the number of printing units or printing forme cylinders involved. Each printing forme cylinder or plate cylinder is preferably mounted at both ends, however it can also be configured as a cantilevered component, in which case the printing forme cylinder or plate cylinder in question is mounted at only one of its end faces, e.g. on a preferably conical journal. Typically, only a single printing cliche is arranged on the lateral surface of each plate cylinder, with the substrate of the printing cliche fully or at least largely spanning the circumference of the plate cylinder in question, in particular more than 80% thereof. The length of the printing element of the printing cliche in the circumferential direction of the relevant plate cylinder is preferably shorter than the circumferential length of the plate cylinder in question. The printing forme or the printing cliche is or at least can be arranged by means of its substrate, in particular magnetically, on the lateral surface of any of the plate cylinders, i.e. the printing forme or the printing cliche is preferably held there magnetically, i.e. by means of a magnetic holding force. In an alternative or additional variant of the device for printing on or decorating hollow bodies, each of which has a preferably cylindrical lateral surface, at least one of the printing units, or each of a plurality of these printing units, is configured as a printing unit that prints in a forme-less digital printing process, with such a printing unit having, in particular, at least one inkjet print head or one laser.

The simultaneous transfer, in particular, of multiple printing inks in particular to the lateral surface of the hollow body in question requires proper register to be maintained during this ink transfer in order to achieve good print quality in the printing process. For a true-to-register arrangement of the printing forme or the printing cliche on the lateral surface of the printing forme cylinder or plate cylinder in question, in the preferred embodiment a plurality of register pins, e.g. the position of each being adjustable, are preferably provided on the lateral surface of the printing forme cylinder or plate cylinder in question, which pins engage in corresponding recesses formed on the printing forme or on the printing cliche, thereby giving the printing forme or printing cliche a defined position in its arrangement on the lateral surface of the printing forme cylinder or plate cylinder in question. In particular, a lateral register of the printing forme or the printing cliche can be aligned, e.g. with a cut side edge of said printing forme or said printing cliche, and a circumferential register of said printing forme or said printing cliche can be aligned with a stop. In a preferred embodiment, each printing forme cylinder or plate cylinder has a diameter of between 100 mm and 150 mm, in particular between 120 mm and 130 mm, with the axial length of the relevant printing forme cylinder or plate cylinder being, e.g., between 200 mm and 250 mm, in particular between 200 mm and 220 mm. The printing cliche to be arranged on the lateral surface of the plate cylinder in question has a width in the axial direction of the relevant plate cylinder that ranges from 150 mm to 200 mm, and is preferably about 175 mm.

Each of the printing forme cylinders, e.g. configured as a plate cylinder, that is used in the printing process uses its printing forme or its printing cliche to transfer a specific printing ink onto a printing blanket. The printing inks used are typically premixed, in particular customized inks specific to the print order, which are specifically adapted in terms of their respective printability to the material of the hollow body to be printed on, depending upon whether the surface to be printed on is made e.g. of aluminum, tinplate, or plastic. In a preferred embodiment of a device for printing on or for decorating hollow bodies, each of which has, e.g. a cylindrical lateral surface, a device for transferring printing ink from the printing forme or the printing cliche to the lateral surface of the hollow body in question is provided. This device for transferring printing ink is preferably embodied, e.g. as a segmented wheel that rotates about a horizontal axis, in particular, wherein a plurality of printing blankets, e.g. eight, ten, twelve or even more, preferably are or at least can be arranged one behind the other on the periphery of said segmented wheel, i.e. along its circumference. As an alternative to the segmented wheel, and depending on the printing method that is used, the device for transferring printing ink may also be embodied as a decorating drum or as a printing blanket cylinder or as a transfer cylinder, each of which is rotatable about an axis of rotation, at least during printing. The printing blankets have hitherto been arranged on the circumference of the segmented wheel by attaching each of the printing blankets to the circumference of the segmented wheel, e.g. by an adhesive connection, preferably by gluing. Each of the preferably multiple printing forme cylinders or plate cylinders is or at least can be thrown radially onto the printing blankets that are arranged on the circumference of the segmented wheel in question. In a particularly preferred embodiment of a device for printing on or decorating hollow bodies, each of which has, e.g. a cylindrical lateral surface, a greater number of printing blankets are provided one behind the other along the circumference of the segmented wheel than the number of printing forme cylinders or plate cylinders which are or at least can be thrown radially onto the segmented wheel. The device for transferring printing ink, preferably in the form of a carousel, in particular the segmented wheel, has a diameter of, e.g. 1,400 mm to 1,600 mm, preferably of about 1,520 mm to 1,525 mm, and when e.g. eight printing forme cylinders or plate cylinders are assigned to said device, it has e.g. twelve printing blankets arranged one behind the other around its circumference. The surface of each printing cliche is preferably configured as harder than the respective surface of the printing blankets. The surface of the printing blankets is preferably flat, i.e. without profiling. In an operating mode in which the printing forme cylinders or plate cylinders involved in the printing process are each thrown radially onto the printing blankets of the rotationally driven segmented wheel, the respective printing formes of these printing forme cylinders or the respective printing cliches of these plate cylinders roll along the printing blankets that are moved by the segmented wheel, with each of the printing cliches pressing at least its print relief into the respective printing blanket. The intensity of this impression is or can be adjusted, e.g. prior to or at the start of a printing process, e.g. by means of remote actuation, by adjusting the contact pressure exerted by the printing forme cylinder or plate cylinder in question on the printing blanket in question of the segmented wheel.

Each of the hollow bodies to be printed on here by way of example, e.g. each of the two-part cans to be printed on, is moved, e.g. by means of a transport device that preferably transports the hollow bodies to be printed on along at least a portion of a circular path, that is, a circular arc, around a rotational axis, preferably by means of at least one feed wheel, in particular by means of a mandrel wheel, in a continuous movement or in a set cycle, up to at least one of the printing units belonging to the device for printing on hollow bodies, each of which has a lateral surface, and is thereby transported into the printing zone of at least one of these printing units. In particular, each of the hollow bodies to be printed on is moved by means of the transport device up to at least one of the printing blankets arranged, e.g. on the segmented wheel, or each of the hollow bodies to be printed on is transported directly and immediately, i.e. without assistance from a device for transferring printing ink, e.g. embodied as a segmented wheel, into the respective printing zone of at last one of these printing units, which is the case, for example, when the printing unit in question prints in a direct printing process, for example in an inkjet printing process.

Figure 19:
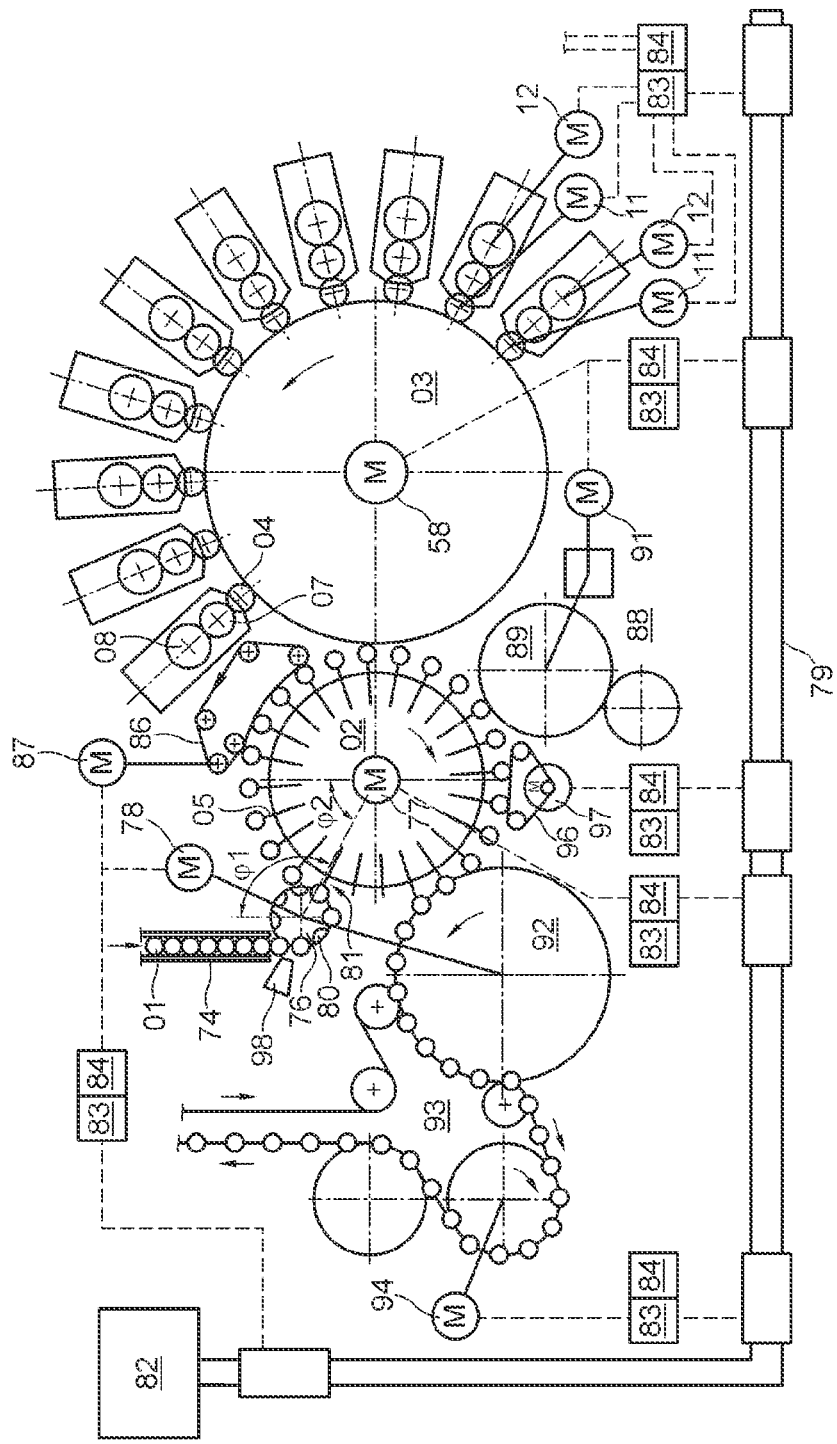
FIG. 19 shows the device for printing on hollow bodies with multiple independent drives.

The feed wheel or mandrel wheel 02, which like, e.g., the segmented wheel, rotates about a preferably horizontal axis, has a plurality of holding devices 05, or holders, as seen in FIG. 19 e.g. 24 or 36 such holding devices 05, concentrically to its circumferential line in preferably equidistant distribution, e.g. each in the form of a clamping mandrel or a spindle that projects cantilevered from an end face of the mandrel wheel, wherein each holder 05 holds or at least is capable of holding one of the hollow bodies to be printed on. A transport device embodied as a mandrel wheel is also characterized herein as a turntable with spindles. A mandrel wheel is described, e.g. in EP 1 165 318 A1. A description of suitable holders, spindles and/or clamping mandrels may be found, e.g., in WO 2011/156052 A1. In the following, each clamping mandrel will be referred to simply as a mandrel. The longitudinal axis of each mandrel is oriented parallel to the axis of the mandrel wheel. In the case involving printing on hollow bodies, each of which is embodied, e.g. as a two-part can, each of these hollow bodies is moved, e.g. by means of a conveyor device, e.g. a belt conveyor and/or a conveyor wheel 76 having a plurality of carrier elements 80, up to the transport device, embodied e.g. as a mandrel wheel, where it is inverted at a transfer station onto one of the mandrels of the mandrel wheel by suction, e.g. by means of a vacuum, and is then held by the mandrel in question, while the transport device embodied as a mandrel wheel 02 transports the respective hollow body to be printed on, e.g. to the segmented wheel 03 which is loaded with at least one printing blanket and thus in the direction of at least one of the printing units, or in an alternative embodiment that has no segmented wheel, for example, directly to at least one of the printing units. Typically, a large number of hollow bodies to be printed on are fed to the mandrel wheel in rapid succession by the conveyor device. A conveyor device is described, e.g. in EP 1 132 207 A1.

A gap measuring less than 1 mm in width, e.g. measuring 0.2 mm in width, is preferably formed between the inner wall of a respective hollow body to be printed on and the surface of the relevant mandrel of the mandrel wheel, so that the hollow body to be printed on is not held on the mandrel in question by means of a press fit. Each mandrel can be rotated nearly without friction about its respective longitudinal axis. Each of the mandrels is or at least can be adjusted, e.g. by means of friction, to a specific circumferential speed by a drive means cooperating with the respective mandrel, so that in addition to being rotated by the mandrel wheel, each hollow body to be printed on that is held by a mandrel can be rotated by a rotation that is or at least can be carried out independently by the mandrel. The hollow body to be printed on is preferably inverted onto one of the mandrels of the mandrel wheel during a phase when the mandrel in question is stationary; during said stationary phase, the mandrel in question executes no rotational movement about its own longitudinal axis. The loading of each mandrel with a hollow body to be printed on is preferably verified, e.g. in a contactless manner by means of a sensor. If a mandrel is not loaded with a hollow body to be printed, the mandrel wheel will move, e.g. in such a way that contact of said unoccupied mandrel and possibly of a small number of additional mandrels with a printing blanket of the segmented wheel is reliably prevented.

Before being fed, e.g. to the mandrel wheel, two-part cans to be printed on are produced, e.g. deep-drawn from a circular blank, in a processing station disposed upstream of the mandrel wheel. In an additional processing station, the rim of each two-part can is trimmed at its open end face. In additional processing stations, each two-part can is washed, for example, in particular its inside is washed out, and optionally, the inner wall and the base of the two-part can in question is also coated. At least the exterior lateral surface of each two-part can is primed, for example, in particular with a white primer. Once the printing on its lateral surface is complete, each two-part can is removed from its respective holder, e.g. on the mandrel wheel, e.g. by means of compressed air or by means of a preferably reversible magnet, and is fed to at least one processing station located downstream of the mandrel wheel, e.g. to a coating station for coating the exterior lateral surface of each printed two-part can and/or to a rim processing station. The printed two-part cans pass in particular through a dryer, e.g. a hot air dryer, to cure the at least one printing ink applied to their respective lateral surfaces.

The printing process for printing in particular on the lateral surfaces of hollow bodies, in particular two-part cans, held, e.g. on the mandrel wheel, begins with each of the printing inks that are required for the printing image to be printed onto the lateral surface of each hollow body being applied, e.g. by the respective printing cliche of the plate cylinder that is thrown, e.g. onto the segmented wheel, to the same one of the printing blankets arranged on the circumference of the segmented wheel. The printing blanket in question, inked up in this manner with all the necessary printing inks, then transfers these printing inks simultaneously onto the lateral surface of the hollow body to be printed on by means of direct surface contact between the printing blanket and the lateral surface of the hollow body to be printed on during a single revolution of said hollow body to be printed on about its longitudinal axis, said hollow body being held on one of the mandrels of the mandrel wheel. During the transfer of the printing inks from the printing blanket onto the lateral surface of the hollow body, the hollow body to be printed on, held, e.g. by one of the mandrels of the mandrel wheel, rotates at the same circumferential speed as the printing blanket in question, arranged, e.g. on the circumference of the segmented wheel. The respective circumferential speeds of hollow body and printing blanket or segmented wheel are therefore synchronized with one another, in which the hollow body to be printed on, which is held, e.g. on one of the mandrels of the mandrel wheel, is accelerated appropriately, in particular by a drive means acting on the relevant mandrel, e.g. from a stationary position in particular until the circumferential speed, e.g., of the segmented wheel is reached, wherein the circumferential speed of the relevant mandrel of the mandrel wheel is synchronized, preferably beginning from a first point of contact between the hollow body to be printed on and the relevant printing blanket and continuing as its lateral surface rolls along a path, e.g. of the first 50 mm of the circumferential length of the printing blanket, with the circumferential speed of the segmented wheel. In the preferred embodiment, the segmented wheel that carries the relevant printing blanket determines the circumferential speed to be set, e.g. at the respective mandrel of the mandrel wheel. The circumferential speed of the printing forme cylinder that carries the printing forme or of the plate cylinder that carries the printing cliche also preferably is or will be adjusted based upon the circumferential speed, e.g. of the segmented wheel. In the preferred embodiment, the mandrel wheel and the segmented wheel are each driven individually by a separate drive, and the respective rotational behavior of each is controlled or regulated by a control unit.

In the following, various details relating, in particular, to the above-described device for printing on or decorating hollow bodies each of which has, e.g. a cylindrical lateral surface will be described by way of example. FIG. 1 shows a simplified schematic representation of an example of a generic device for printing on or decorating hollow bodies 01, e.g. two-part cans 01, each having a preferably cylindrical lateral surface, in particular, wherein said hollow bodies 01 are fed sequentially by a conveyor device to the transport device configured, e.g. as a rotating or at least rotatable feed wheel, in particular as a mandrel wheel 02, and are held on said transport device, each on a single holder. In the following, based on the selected exemplary embodiment of the printing press or the device for printing on hollow bodies, it will be assumed that this transport device is configured preferably as a mandrel wheel 02. A device for transferring printing ink, e.g. a rotating or at least rotatable segmented wheel 03, along the circumference of which a plurality of printing blankets are arranged in a row, preferably cooperates with mandrel wheel 02. Assigned to segmented wheel 03, mentioned by way of example, and arranged along its circumferential line, a plurality of printing forme cylinders 04, in particular plate cylinders 04, that are or at least can be thrown radially onto said segmented wheel 03 are provided, with a printing forme, in particular a printing cliche, being arranged on the lateral surface of each of these printing forme cylinders 04 or plate cylinders 04, said printing cliche being configured in particular for carrying out a letterpress printing process. A specific printing ink is fed by means of an inking unit 06 to each of the printing forme cylinders 04 or plate cylinders 04 for the purpose of inking up the printing forme or printing cliche thereof. In the following, it will be assumed by way of example that each of the printing forme cylinders 04 is configured as a plate cylinder 04 that carries at least one printing cliche.

Figure 2:
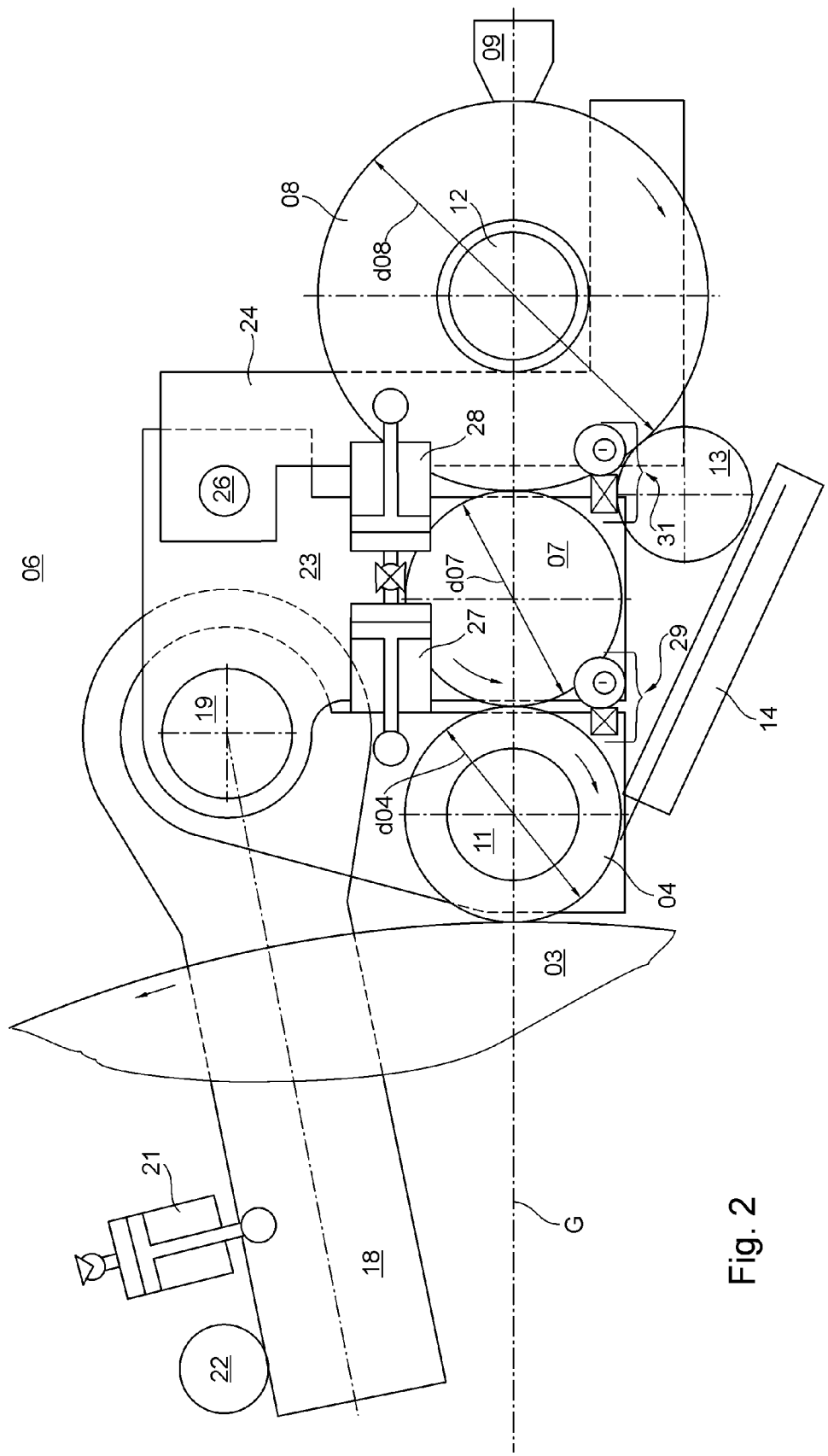
FIG. 2 shows an inking unit, in particular for the device shown in FIG. 1, in a first operating position.
Figure 3:
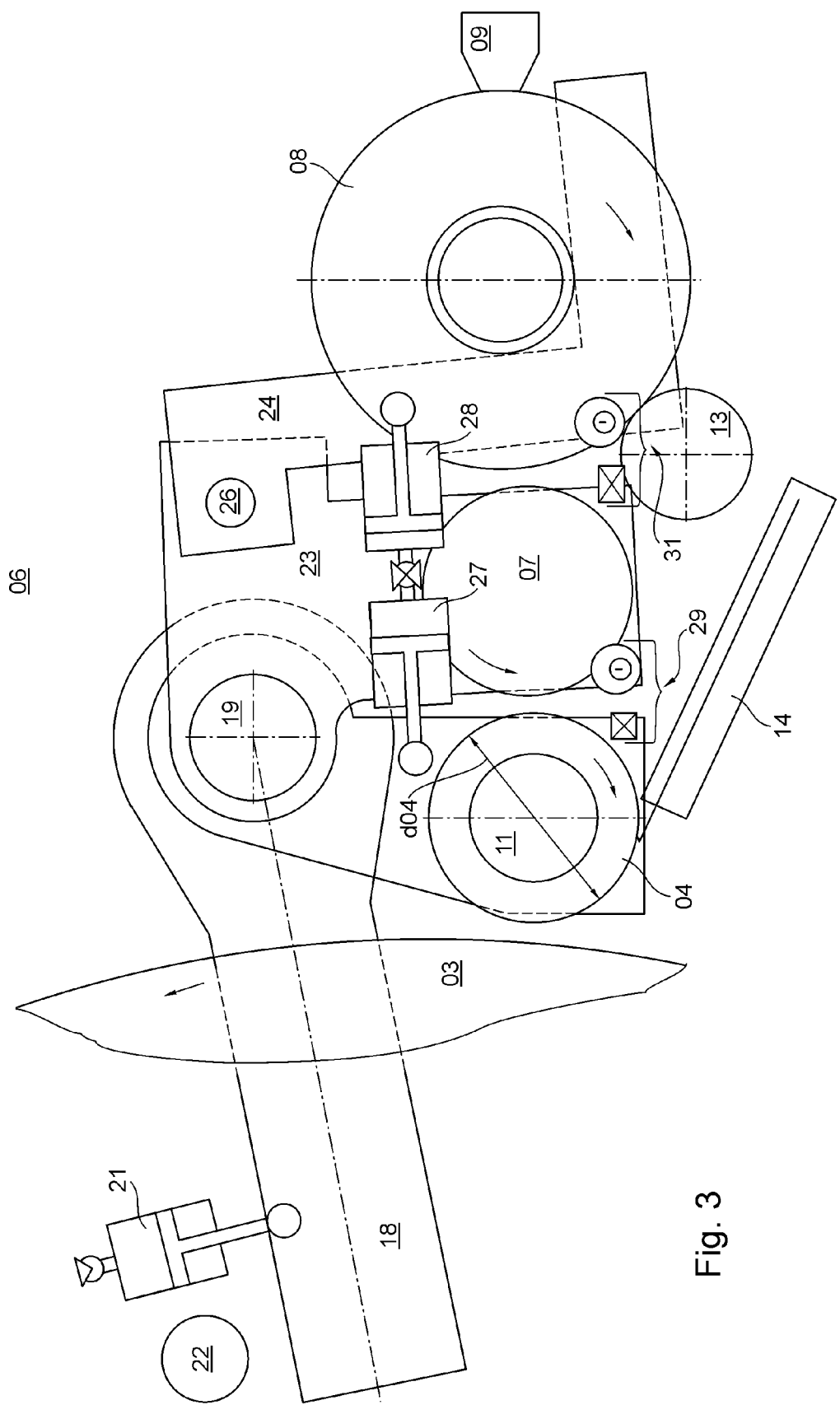
FIG. 3 shows the inking unit in particular for the device shown in FIG. 1 in a second operating position.

FIGS. 2 and 3 show a simplified schematic representation of a number of details of inking unit 06, one of which cooperates with each plate cylinder 04, and which is provided, e.g. for use in the device shown in FIG. 1 for printing on or decorating in particular hollow bodies 01, each having a preferably cylindrical lateral surface. The inking unit 06 proposed here advantageously has a very short roller train, i.e. consisting of only a few rollers, preferably a maximum of five, in particular a two-roller train, for transporting ink from an ink reservoir to the relevant plate cylinder 04. In the case of a two-roller train, said roller train consists of only a single ink forme roller 07 and one anilox roller 08. An inking unit 06 with a roller train consisting of no more than five rollers is classified as a short inking unit. FIG. 2 shows an example of a (short) inking unit 06 having a two-roller train in a first operating position, in which inking roller 07 and anilox roller 08 are thrown onto one another, inking roller 07 is thrown onto plate cylinder 04, and plate cylinder 04 is thrown radially onto the device, in particular the segmented wheel 03, for transferring printing ink from plate cylinder 04 onto the lateral surface of the hollow body 01 in question. In contrast, FIG. 3 shows a second operating position for the inking unit 06 shown in FIG. 2, in which inking roller 07 and anilox roller 08 are thrown off of one another, inking roller 07 is thrown off of plate cylinder 04, and plate cylinder 04 is thrown off of the device for transferring printing ink, in particular the segmented wheel 03. The throw-on and throw-off mechanism will be described further below.

Plate cylinder 04 and anilox roller 08 are each rotated, e.g. separately, each by a motor 11; 12, in particular in the preferred inking unit 06 as shown in FIGS. 2 and 3, in which the motor 11; 12 in question is in particular controlled or at least controllable, e.g. in terms of its respective speed, by e.g. an electronic control unit. The device for transferring printing ink, configured, e.g. as a segmented wheel 03, is rotationally driven by a separate dedicated drive. Inking roller 07 is or will be rotationally driven by anilox roller 08 by means of friction. In the preferred embodiment, the outer diameter d07 of inking roller 07 is equal to the outer diameter d04 of plate cylinder 04, which carries at least one printing forme, in particular at least one printing cliche. At least one printing cliche is or at least can be arranged on the lateral surface of plate cylinder 04, so that in the embodiment in which the outer diameters d04; d07 are equal, the circumferential lengths of plate cylinder 04, which carries the printing cliche, and inking roller 07 are also equal. In the preferred embodiment, when the inking unit 06 that cooperates with the plate cylinder 04 is in the first operating position, in which inking roller 07 and anilox roller 08 are thrown onto one another, inking roller 07 is thrown onto plate cylinder 04, and plate cylinder 04 is thrown onto segmented wheel 03, at least the centers of plate cylinder 04, inking roller 07, and anilox roller 08 are arranged along the same straight line G. To detect the rotation of inking roller 07, a detection device, e.g. in the form of a rotary encoder is provided, said rotary encoder being rigidly connected, in particular, to the shaft of inking roller 07. The signal generated by the rotary encoder with a rotation of inking roller 07 is used by the control unit to adjust or if necessary to track the rotational speed of inking roller 07 by means of the rotation of anilox roller 08 such that synchronization between plate cylinder 04 and inking roller 07 is or is to be established, and therefore such that the circumferential speed of inking roller 07 coincides with the circumferential speed of plate cylinder 04 within predefined permissible tolerance limits. To achieve this goal, it may be provided that the control unit adjusts the circumferential speed of anilox roller 08, preferably during the adjustment phase carried out by the control unit, in such a way that the anilox roller has a lead or lag time relative to the circumferential speed of plate cylinder 04, in particular briefly, and thus not permanently. By configuring plate cylinder 04 and inking roller 07 as having equal circumferential lengths, and by establishing synchronization between plate cylinder 04 and inking roller 07, the adverse effect on print quality of ghosting is largely avoided. The drive concept described herein involving a friction-driven inking roller 07 also has the advantage that a separate dedicated drive for inking roller 07 is not required, which saves on costs and also facilitates replacement of inking roller 07, e.g. during maintenance and repair operations, due to the simpler mechanical construction.

In its preferred embodiment, inking roller 07 has a closed, preferably rubberized lateral surface. The lateral surface of anilox roller 08 is coated, e.g. with a ceramic, with a hachure, e.g. of 60, 80 or 100 lines per centimeter of axial length of anilox roller 08 or a saucer structure being formed in the ceramic layer. To enable the largest possible volume of printing ink to be fed into the roller train of inking unit 06 with each revolution of anilox roller 08, the outer diameter d08 of anilox roller 08 is preferably configured as larger than the outer diameter d07 of inking roller 07. This is intended to give anilox roller 08 the greatest possible delivery volume. In FIG. 2, the directions of rotation of segmented wheel 03, plate cylinder 04, inking roller 07, and anilox roller 08 are each indicated by a rotational arrow.

In the preferred embodiment, at least anilox roller 08 has a temperature control device for controlling the temperature of the lateral surface of anilox roller 08. The temperature control device of anilox roller 08 operates e.g. using a temperature control fluid that is introduced into the interior of anilox roller 08, the temperature control fluid being, e.g. water or some other liquid coolant. The temperature control device of anilox roller 08 can be used to influence the delivery volume of anilox roller 08, as said device influences the viscosity of the printing ink to be transported by inking unit 06. The delivery volume of anilox roller 08 and the viscosity of the printing ink to be transported by inking unit 06 in turn ultimately impact the ink density of the printing ink to be applied to the cylindrical lateral surface of the hollow body 01 to be printed on. The thickness of the ink film formed by the printing ink to be applied to the cylindrical lateral surface of hollow body 01 to be printed on is, e.g. less than 10 µm, in particular within a range of approximately 2 µm to 3 µm.

Figure 4:
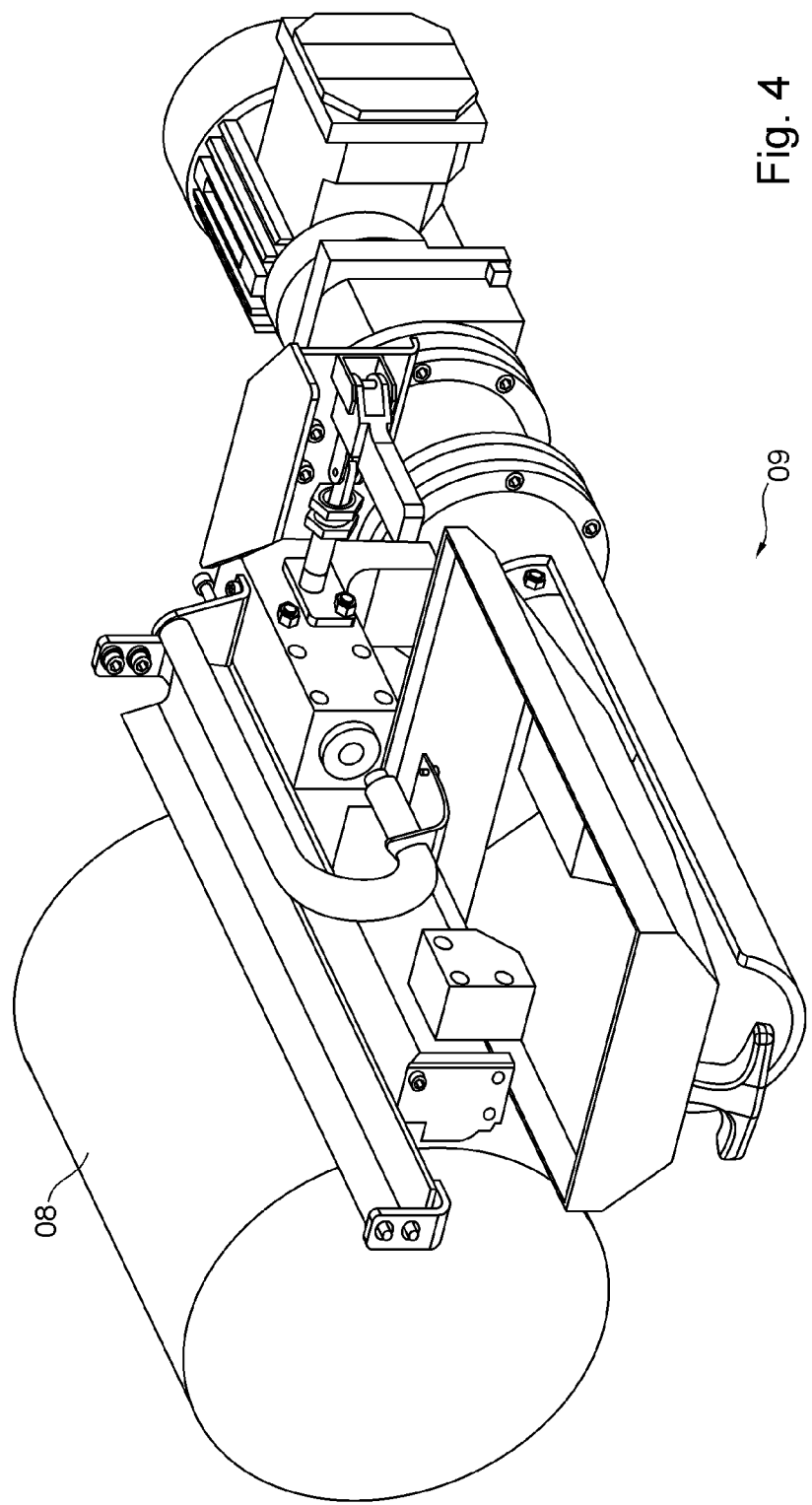
FIG. 4 shows a chamber doctor blade system, in particular for the inking unit shown in FIGS. 2 and 3.

The ink reservoir of inking unit 06 is embodied, e.g. as a chamber doctor blade system 09 that operates in conjunction with anilox roller 08. Advantageously, in this chamber doctor blade system 09, at least one ink trough, a doctor blade bar that is or at least can be set axially parallel against anilox roller 08, and preferably also a pump for delivering the printing ink form a single structural unit. This chamber doctor blade system 09 is held or mounted in inking unit 06, i.e. on a frame of inking unit 06, preferably on only one side, e.g. by means of a suspension, so that once this modular unit has been released from the frame of inking unit 06 it can be removed from inking unit 06 in a simple manner laterally, i.e. by a movement directed axially parallel to anilox roller 08, e.g. by pulling on a handle disposed on said structural unit, and can thereby be replaced. This structural unit of chamber doctor blade system 09 preferably forms a cantilevered arm on a side frame of inking unit 06. FIG. 4 shows a perspective view of chamber doctor blade system 09, configured as a separate modular unit, in cooperation with anilox roller 08 of inking unit 06.

Figure 5:
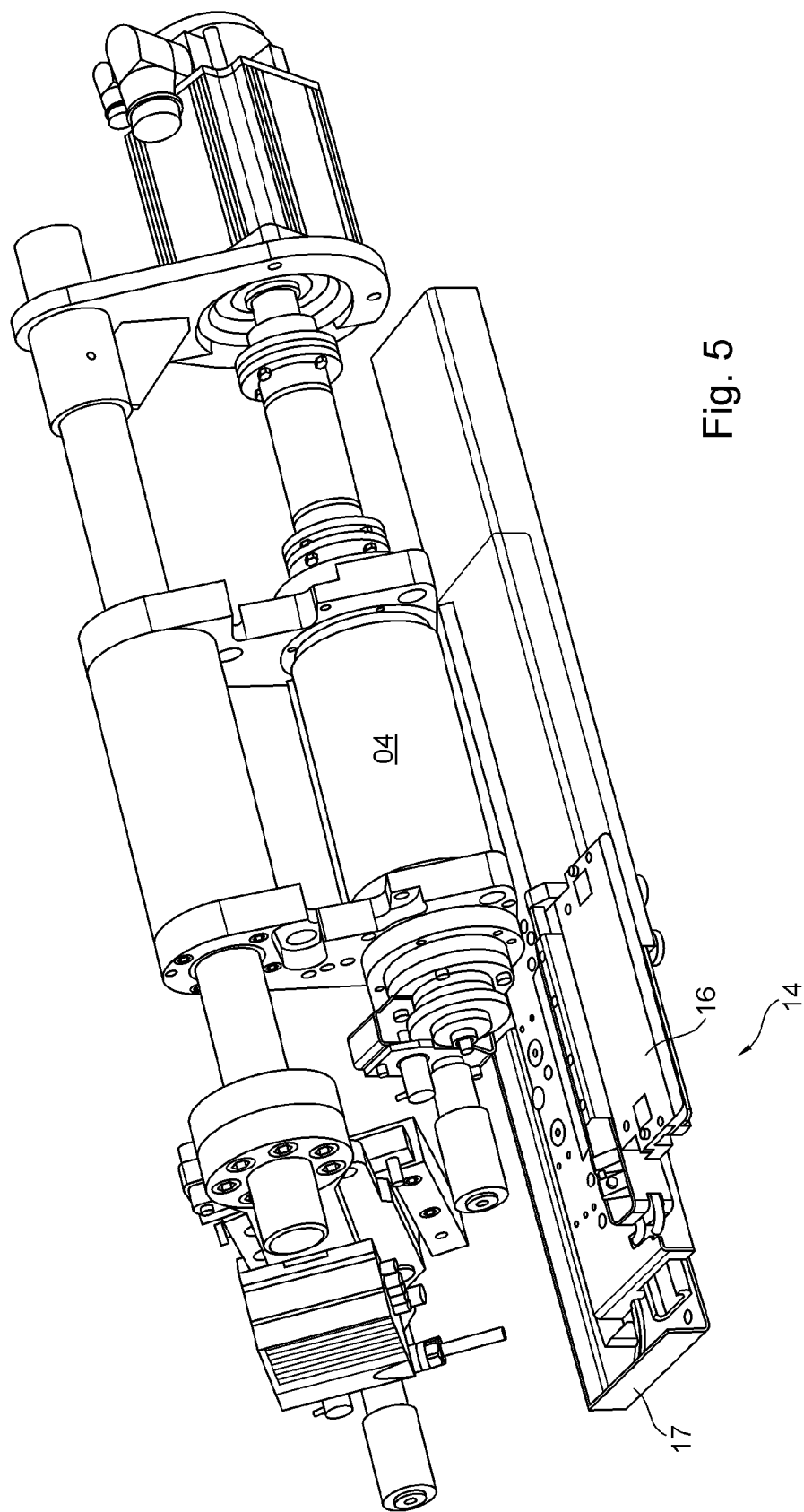
FIG. 5 shows a plate changer in a first operating position.
Figure 6:
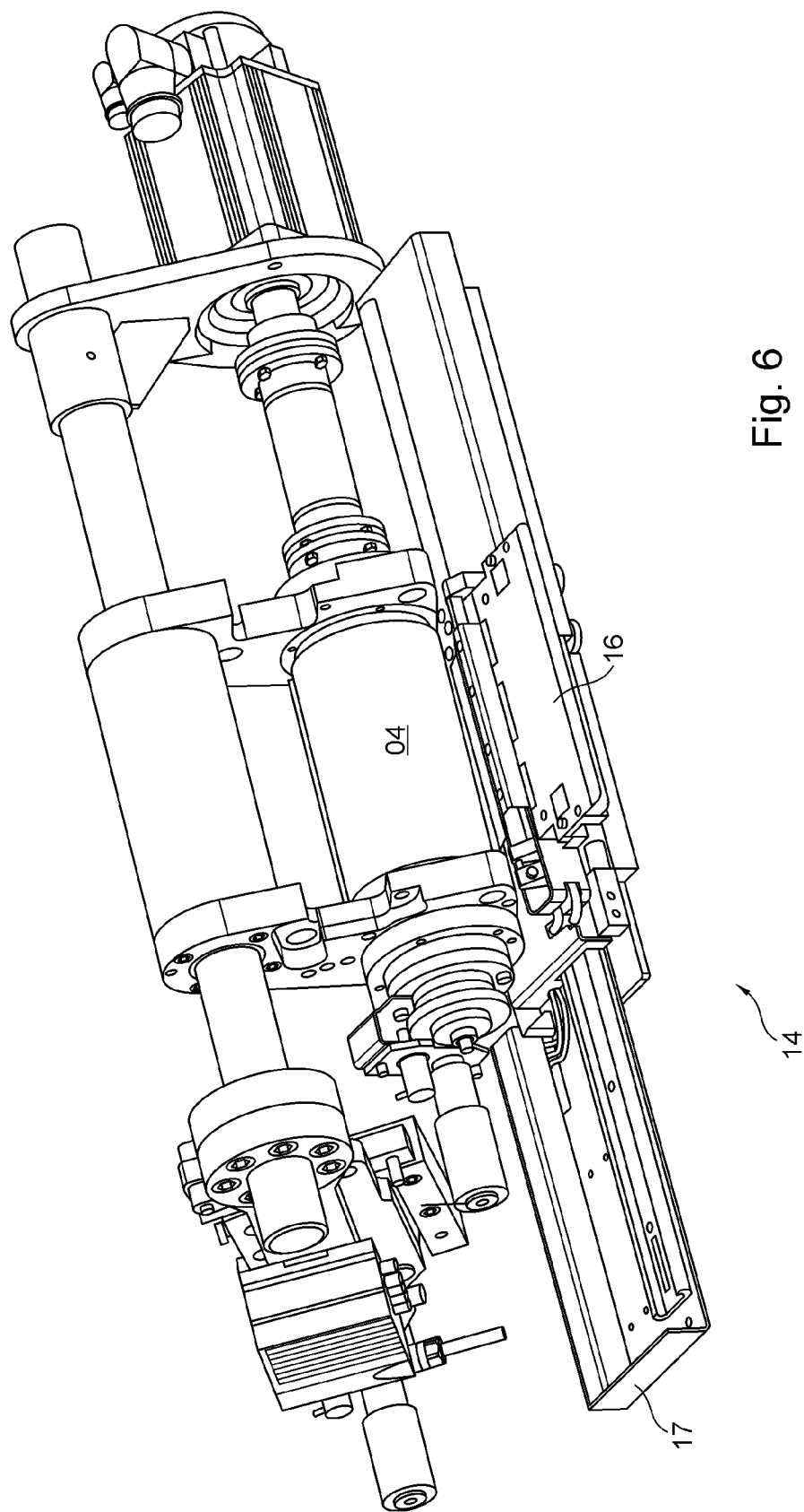
FIG. 6 shows the plate changer of FIG. 5 in a second operating position.
Figure 7:
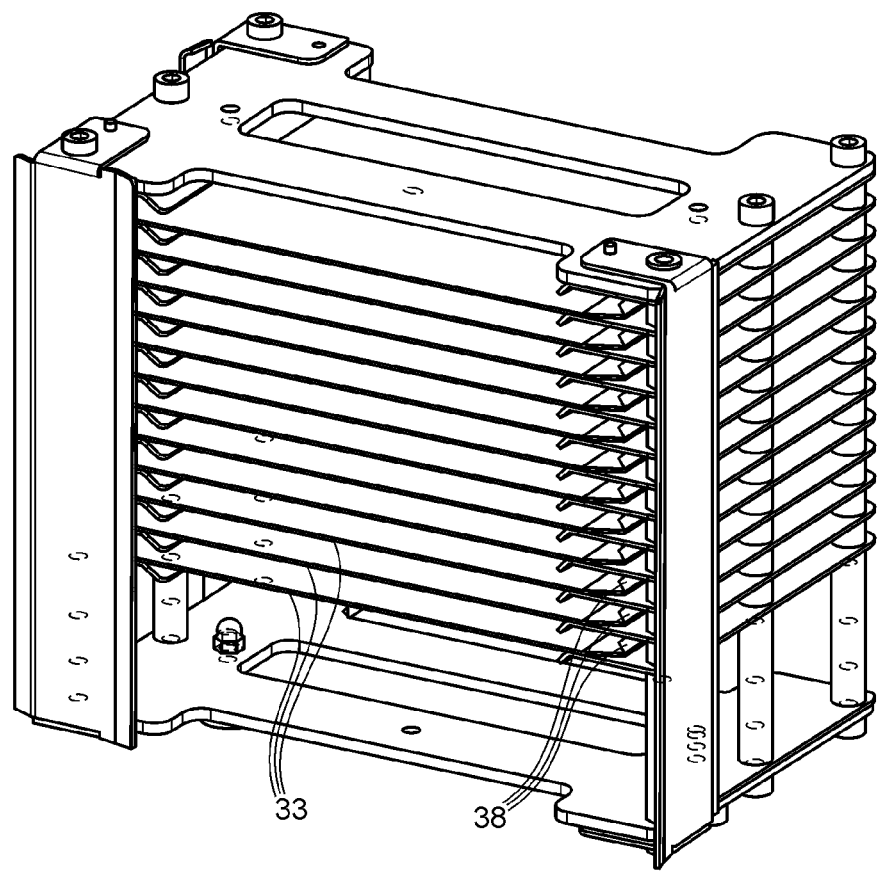
FIG. 7 shows a magazine for printing blankets.
Figure 8:
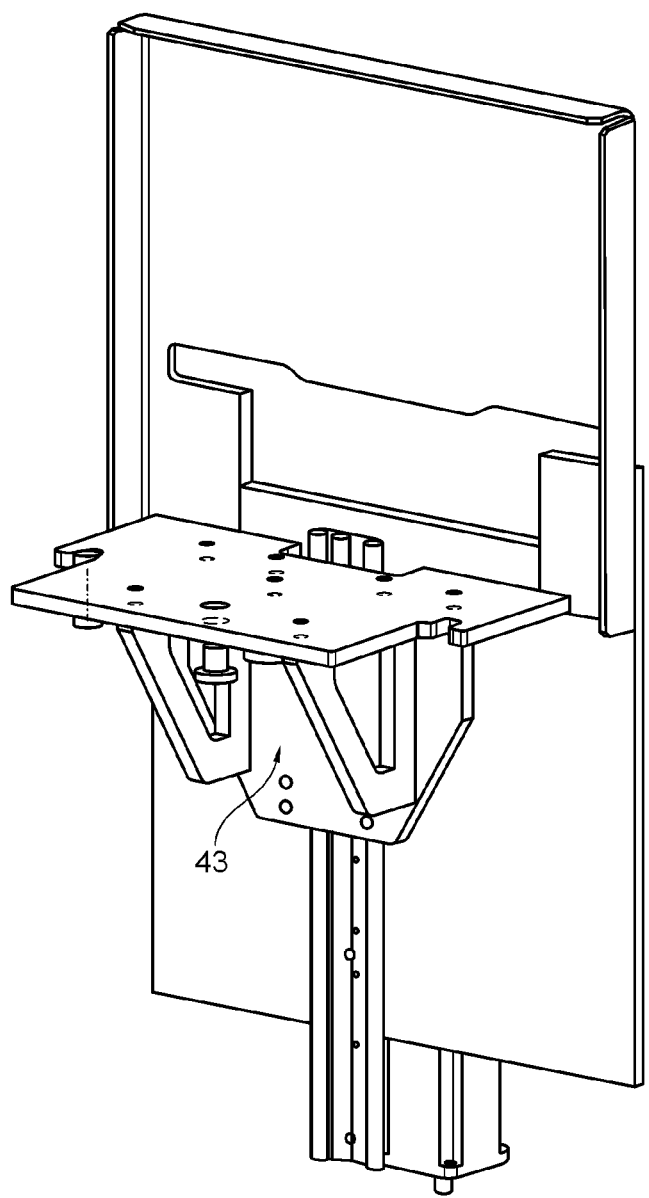
FIG. 8 shows a device for vertical transport of the magazine shown in FIG. 7.

Once anilox roller 08 has received printing ink from the ink reservoir, i.e. in particular from chamber doctor blade system 09, anilox roller 08 transports this printing ink immediately and directly or via additional rollers of the roller train which is part of inking unit 06 to the preferably only one inking roller 07. In a region downstream of the chamber doctor blade system 09, which is set against anilox roller 08, between chamber doctor blade system 09 and inking roller 07 in the direction of rotation of anilox roller 08, a rider roller 13 preferably is or at least can be thrown onto anilox roller 08 for the purpose of improving the transport of ink by anilox roller 08. Rider roller 13 is arranged axially parallel to anilox roller 08. Rider roller 13 is not considered to be part of the roller train of inking unit 06 because it does not transfer printing ink from anilox roller 08 to another roller. Rider roller 13, which is rotationally driven by anilox roller 08, e.g. by means of friction, has a rubberized lateral surface, for example. As rider roller 13, which is thrown onto anilox roller 08, rolls along the lateral surface of anilox roller 08, it draws a portion of the printing ink that has been received by anilox roller 08 from chamber doctor blade system 09 out of the hachure or the saucers of anilox roller 08 and deposits at least some of this printing ink onto lands that are formed on the lateral surface of anilox roller 08. Rider roller 13 rolling along anilox roller 08 thus causes anilox roller 08 to deliver a greater volume of printing ink to inking roller 07. As a further consequence, an anilox roller 08 that includes, e.g. a temperature control device also improves the efficacy of controlling the ink density in that the rider roller 13 rolling along anilox roller 08 contributes to supplying a greater volume of printing ink. Regardless of the specific configuration of anilox roller 08, i.e. with or without a temperature control device, rider roller 13 rolling along anilox roller 08 thus reduces both differences in density that can arise due to manufacturing tolerances of the anilox roller 08 and the risk of the hachure or saucers of anilox roller 08 being visible on the printing substrate, i.e. in this case on the lateral surface of the hollow body 01 to be printed on, due to an insufficient application of ink, at least in some areas. In a highly advantageous embodiment of the device for printing on hollow bodies, a plate changer 14 is provided, e.g. for each printing forme cylinder, in particular plate cylinder 04, preferably in a fixed assignment thereto, with which plate changer the printing forme intended for the printing forme cylinder in question or the printing cliche intended for the plate cylinder 04 in question can be replaced, preferably automatically, within e.g. the relevant device for printing on or decorating hollow bodies 01, each having in particular a cylindrical lateral surface. FIGS. 5 and 6 show a perspective view of a preferred embodiment of a plate changer 14 of highly advantageous configuration, in two different operating positions for performing a plate change or printing forme change that can be completed, e.g. during a change in production, within a very short makeready time, preferably automatically, reliably and preferably also while maintaining register. FIG. 5 shows a first operating position, in which, e.g. a printing cliche may be brought forward on the printing forme cylinder or plate changer 14 or removed from plate changer 14, axially to the side of the printing unit. FIG. 6 shows a second operating position, in which, immediately upstream of the printing forme cylinder or plate cylinder 04 and lengthwise thereto, e.g. a printing cliche may be placed from plate changer 14 directly onto the assigned plate cylinder 04, or a printing cliche may be removed from plate cylinder 04 and transported away with plate changer 14 to its first operating position. Plate changer 14 has in particular a planar, e.g. table-shaped bearing surface 16, on which e.g. a printing cliche that is or will be arranged on plate cylinder 04 can be supported, preferably fully. Bearing surface 16 is preferably arranged such that it is movable bidirectionally, i.e. movable back and forth, along a linear transport path, in particular longitudinally to the rotational axis of the associated printing forme cylinder or plate cylinder 04, between at least two defined positions. In a first position of bearing surface 16, located to the side of the printing unit, plate changer 14 assumes its first operating position, and in a second position of bearing surface 16, located immediately upstream of the printing forme cylinder or plate cylinder 04 and longitudinally thereto, the plate changer assumes its second position. In the first operating position, bearing surface 16 of plate changer 14 is located at least partially upstream of an end face of the printing forme cylinder or plate cylinder 04 in question. In the second operating position, bearing surface 16 of plate changer 14 is preferably at least partially beneath the lateral surface of the printing forme cylinder or plate cylinder 04. Bearing surface 16 of plate changer 14 moves, e.g. along a cross-member 17 arranged longitudinally with respect to the printing forme cylinder or plate cylinder 04. Bearing surface 16 of plate changer 14 thus has an axial travel path with respect to the printing forme cylinder or plate cylinder 04 in question. At the positions that define the first and second operating positions of plate changer 14, the movement of bearing surface 16 is limited in each case, e.g. by a stop. At least the substrate of the printing cliche in question is formed, e.g. by a trimming process, which is carried out in particular using register marks, such that the printing cliche in question can be arranged true to register on bearing surface 16 of plate changer 14. For this purpose, at least two edges of the substrate of the printing cliche in question, disposed perpendicular to one another, are brought into direct contact with stops, in particular formed by register pins, located on bearing surface 16 of plate changer 14, with a first edge of the substrate of the printing cliche in question abutting against a first register pin and a second edge of the substrate of the printing cliche in question, orthogonal to the first edge, abutting against a second register pin, and with the position of one of these two register pins being variable and preferably adjustable. By adjusting the variable-position register pin, e.g. the relevant printing cliche can be aligned true to register. The variable-position register pin may be adjusted manually or automatically. Since the printing cliche is supplied to the relevant plate cylinder 04 true to register, e.g. no centering pin or any other register device is provided is on plate cylinder 04.

In its preferred embodiment, in addition to bearing surface 16 for receiving a printing cliche to be supplied, in particular true to register, e.g. to plate cylinder 04, plate changer 14 has, e.g. a compartment in which, e.g. a printing cliche that has been removed from plate cylinder 04 may be placed. A printing cliche held, e.g. by means of its substrate, in particular magnetically, on the lateral surface of the plate cylinder 04 in question is or at least can be lifted off of the lateral surface of the plate cylinder 04 in question, e.g. by means of a tool guided tangentially to the printing forme, e.g. by means of a spatula guided between the substrate of the printing cliche and the lateral surface of the plate cylinder 04 in question. The end of a printing cliche that has been lifted off of the lateral surface of the plate cylinder 04 in question is introduced by a rotation of the plate cylinder 04 in question into the appropriate compartment of plate cylinder 04. The further rotation of said plate cylinder 04 then pushes the entire printing cliche detached from the lateral surface of the relevant plate cylinder 04 into the appropriate compartment of plate changer 14.

A printing cliche to be supplied, preferably true to register, to the plate cylinder 04 in question is held, in particular after being aligned true to register, on bearing surface 16 of plate changer 14 by a magnetic holding force. At least one plunger, and preferably two plungers arranged spaced apart longitudinally along the plate cylinder 04 in question, is/are provided, each having a direction of action directed opposite the magnetic holding force and toward bearing surface 16 of plate changer 14, e.g. substantially orthogonal thereto; with said at least one plunger, at least one end of the printing cliche held on bearing surface 16 of plate changer 14, said end facing the plate cylinder 04 in question, can be detached from said bearing surface 16 and can be transferred to the plate cylinder 04 in question by way of a stroke movement of the at least one plunger. The at least one plunger is or at least can be actuated pneumatically, for example. The printing forme or the printing cliche is held on bearing surface 16 of plate changer 14 or on the lateral surface of plate cylinder 04 by means of magnets, with each of these magnets preferably being embodied as a permanent magnet. The above-described configuration of plate cylinder 04 has the advantage that no conveyor device is required for transferring the printing cliche to the relevant plate cylinder 04 or for removing the printing cliche from the relevant plate cylinder 04, and therefore, plate changer 14 can be realized very inexpensively. In particular, a plate change can be carried out automatically using the plate changer 14 described above.

The throwing on and/or throwing off of printing forme cylinder or plate cylinder 04, inking roller 07 and/or anilox roller 08 and/or the adjustment of the contact pressure exerted by each of these is carried out by means of a throw-on/throw-off mechanism, illustrated by way of example in FIGS. 2 and 3, which will now be described in detail. In the preferred embodiment, the printing forme cylinder or plate cylinder 04 is mounted, in particular at both ends, on a load arm of a first, preferably one-sided lever assembly 18, consisting of a force arm and the load arm, wherein the force arm and the load arm, which is arranged at a fixed angle relative to the force arm, of this first lever assembly 18 can be pivoted jointly about a first rotational axis 19, directed axially parallel to plate cylinder 04. A first drive 21, e.g. in the form of a hydraulic or pneumatic working cylinder and preferably controllable by a control unit, is operatively connected to the force arm of the first lever assembly 18 for the purpose of applying torque about the first rotational axis 19, wherein upon actuation of this first drive 21, the printing forme cylinder or plate cylinder 04 arranged on the load arm of this first lever assembly 18 is either thrown off of a printing blanket, e.g. of the segmented wheel 03 or thrown onto the same, depending upon the direction of action of said drive. To limit the contact pressure exerted by the printing forme cylinder or plate cylinder 04 against the printing blanket in question, e.g. of segmented wheel 03, a first stop 22 which limits the path traveled by the pivoting movement of the printing forme cylinder or plate cylinder 04 toward segmented wheel 03 is provided, for example for the force arm of the first lever assembly 18. The contact pressure exerted by the printing forme cylinder or plate cylinder 04 against segmented wheel 03 is or at least can be adjusted using the first drive 21.

In the preferred embodiment, inking roller 07 is also mounted, in particular at both ends, on a load arm of a preferably one-sided second lever assembly 23, consisting of a force arm and the load arm, wherein the force arm and the load arm of this second lever assembly 23 are pivotable jointly about the first rotational axis 19, which is aligned axially parallel to plate cylinder 04. Likewise in the preferred embodiment, anilox roller 08 is also mounted, in particular at both ends, on a load arm of a preferably one-sided third lever assembly 24, consisting of a force arm and the load arm, wherein the force arm and the load arm of this third lever assembly 24 are pivotable jointly about a second rotational axis 26, which is aligned axially parallel to anilox roller 08, wherein the second rotational axis 26 of the third lever assembly 24 is located on the second lever assembly 23, and wherein the second rotational axis 26 is embodied as fixed on the second lever assembly 23. On the load arm of the first lever assembly 18, a preferably controllable second drive 27 is arranged, which when actuated acts on the force arm of the second lever assembly 23, and which can be used to throw inking roller 07 onto or off of plate cylinder 04, depending upon the direction of action of second drive 27. On the load arm of the second lever assembly 23, a preferably controllable third drive 28 is arranged, which when actuated acts on the force arm of the third lever assembly 24, and which can be used to throw anilox roller 08, preferably together with chamber doctor blade system 09, onto or off of inking roller 07, depending upon the direction of action of third drive 28. The second drive 27 and/or the third drive 28 is/are each also embodied, e.g. in the form of a hydraulic or pneumatic working cylinder. It may be provided that second drive 27 and third drive 28 are or at least can be actuated, e.g. jointly and preferably also simultaneously. The pivoting movement of the load arm of the second lever assembly 23 is limited, e.g. by a first stop system 29 which is preferably adjustable, in particular by means of an eccentric, whereby the contact pressure exerted by ink forme roller 07 against the printing forme cylinder or plate cylinder 04 is or at least can be limited. The pivoting movement of the load arm of the third lever assembly 24 is limited, e.g. by a second stop system 31 which is preferably adjustable, in particular by means of an eccentric, whereby the contact pressure exerted by anilox roller 08 against inking roller 07 also is or at least can be limited. FIG. 2 shows a first operating state, by way of example, in which the first drive 21 and the second drive 27 and the third drive 28 are not activated, or each is in its idle state, in which anilox roller 08 is thrown onto inking roller 07, and inking roller 07 is thrown onto the printing forme cylinder or plate cylinder 04, and the printing forme cylinder or plate cylinder 04 is thrown onto segmented wheel 03. FIG. 3 shows a second operating state, by way of example, in which the first drive 21 and the second drive 27 and the third drive 28 are each activated, and thus each is in its respective working state, in which anilox roller 08 is thrown off of inking roller 07, and inking roller 07 is thrown off of the printing forme cylinder or plate cylinder 04, and the printing forme cylinder or plate cylinder 04 is thrown off of segmented wheel 03. The force arm and/or load arm of each of the three aforementioned lever assemblies 18; 23; 24 is or are each embodied, e.g. as a pair of opposing lever rods or side frame walls, between which either the printing forme cylinder or plate cylinder 04 or the inking roller 07 or the anilox roller 08 is arranged, each in its respective assignment as described above. Each of the three aforementioned lever assemblies 18; 23; 24 is arranged in a different vertical plane, spaced apart from the others, so that none of the lever assemblies can impede the pivoting of the others.

As described above and as shown in FIG. 13, typically a plurality of printing blankets 33, e.g. eight to twelve, are arranged in a row along the circumference of segmented wheel 03, and during the printing process, as this segmented wheel 03 rotates about a rotational axis 34, printing formes of the printing forme cylinder or printing cliches of plate cylinder 04 roll along the printing blankets 33 that are moved by said segmented wheel 03. During rolling, each of the printing cliches, i.e. at least its print relief, presses e.g. 0.2 mm to 0.25 mm deep into the respective printing blanket 33, thereby subjecting the printing blankets to wear and tear, as a result of which, depending upon their condition and, in particular, their mechanical stress, the printing blankets may need to be replaced after a certain number of prints, e.g. after 50,000 hollow bodies 01 have been printed. When a device for printing on or decorating hollow bodies 01, i.e. known as a decorator, having this type of segmented wheel 03 is used in a large-scale production operation to produce, e.g. several hundred or even a few thousand such hollow bodies 01 per minute, e.g. between 1,500 and 3,000 pieces per minute, the printing blankets 33 arranged on the circumference of the segmented wheel 03 need to be replaced quite frequently, in some cases every half hour or about every forty-five minutes. To keep the productivity of such a device for printing on or decorating hollow bodies 01 high, it is advantageous to perform the necessary replacement of the printing blankets 33 arranged on the circumference of segmented wheel 03 with the shortest possible makeready time.

Figure 13:
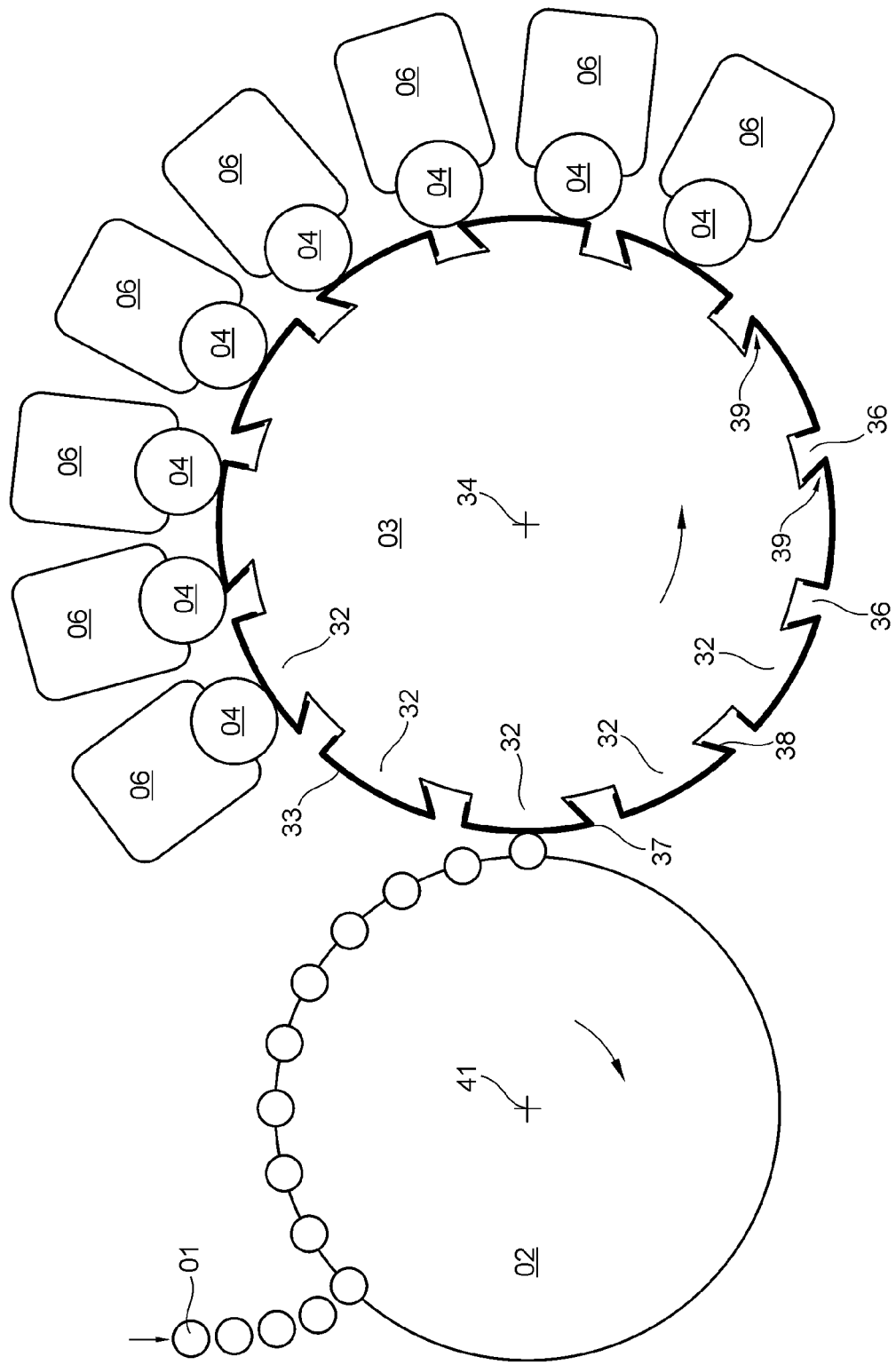
FIG. 13 shows the device of FIG. 1 for printing on or decorating hollow bodies, each of which has a lateral surface, with a schematic representation of the segments of the segmented wheel.

For that reason a device, assigned to segmented wheel 03, for automatically changing the printing blankets 33 is advantageously provided. In the preferred embodiment, each of these printing blankets 33 to be arranged on segmented wheel 03 is applied adhesively, in particular by gluing, to a preferably flat, tabular metal substrate having a material thickness of, e.g. 0.2 mm. Each preferably magnetizable metal substrate is then arranged, together with the printing blanket 33 disposed thereon, in particular in the proper position on one of the segments 32 on the circumference of segmented wheel 03, e.g. by means of at least one of the holding magnets provided there on the circumference for each blanket 33 or the substrate thereof. To support the arrangement of each metal substrate in the proper position on the appropriate segment 32 on the circumference of segmented wheel 03, an acutely angled mounting arm 38 is provided, e.g. at the leading edge 37 of the respective metal substrate in the direction of rotation of segmented wheel 03, and when the respective metal substrate is arranged on one of the segments 32 on the circumference of segmented wheel 03, this mounting arm 38 engages into a recess 36 formed on the circumference of this segmented wheel 03, aligned parallel to the rotational axis 34 thereof and embodied, e.g. as a groove, and comes to rest, in particular in a form-fitting connection, on a leading edge 39 of the recess 36 in question in the direction of rotation of segmented wheel 03. Each of the printing blankets 33 is preferably embodied as a rubber blanket. The direction of rotation of segmented wheel 03 during the printing process is indicated in FIG. 13 by a rotational arrow. During the printing process, hollow bodies 01, each of which is moved on a clamping mandrel by the mandrel wheel 02, which rotates about rotational axis 41, up to segmented wheel 03, are pressed by a predominantly radial movement of the clamping mandrel concerned individually and briefly in succession, i.e. typically for a single revolution of hollow body 01 to be printed, against the printing blanket 33 currently printing.

Figure 9:
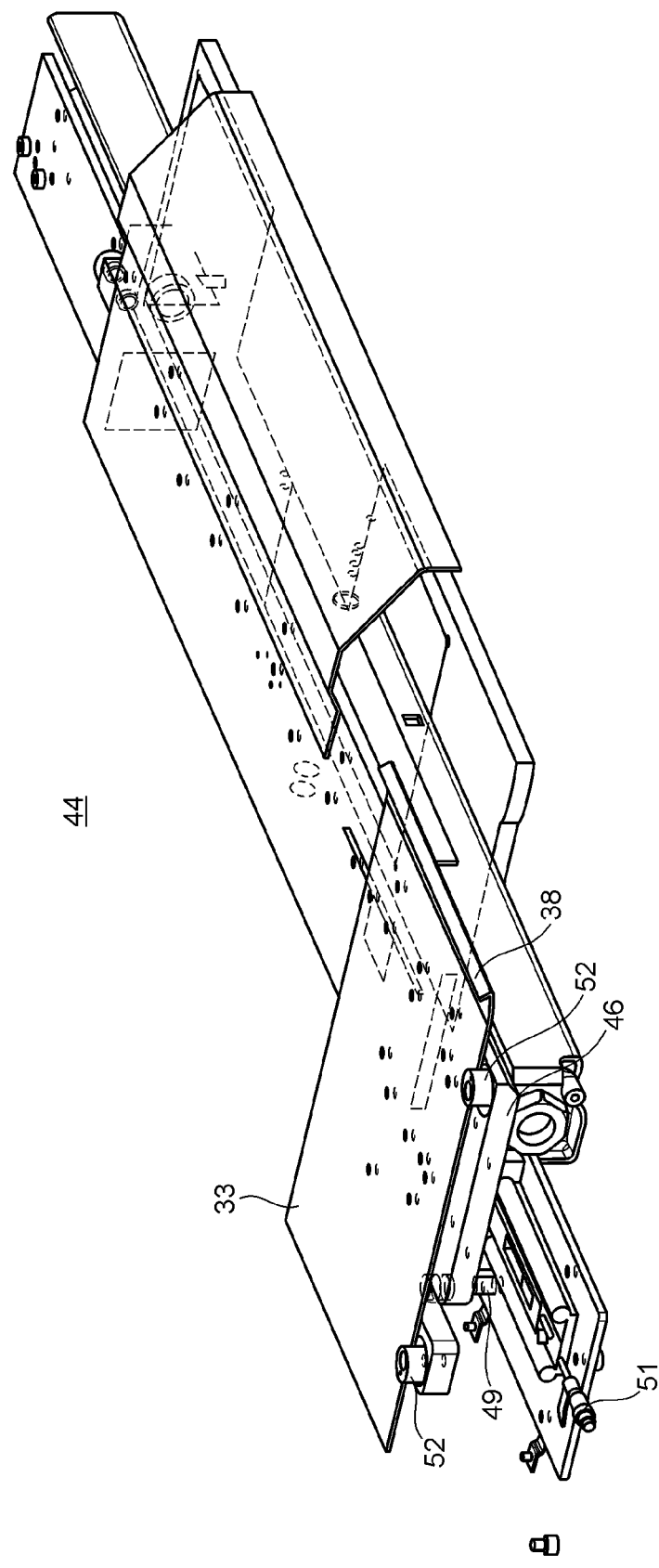
FIG. 9 shows a device for the horizontal transport of one of the printing blankets at a time, between the magazine shown in FIG. 7 and a mounting position on a segmented wheel in the device shown in FIG. 1.
Figure 10:
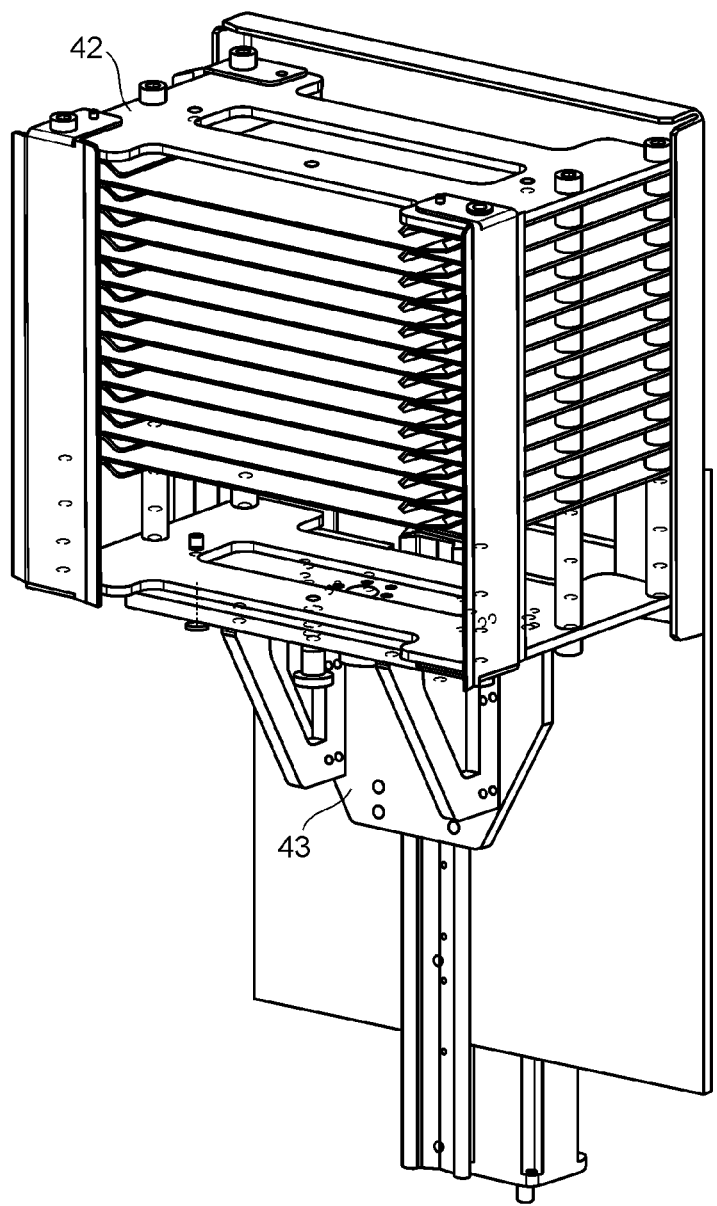
FIG. 10 shows the magazine of FIG. 7 in its operating state disposed on the device provided for its vertical transport.
Figure 11:
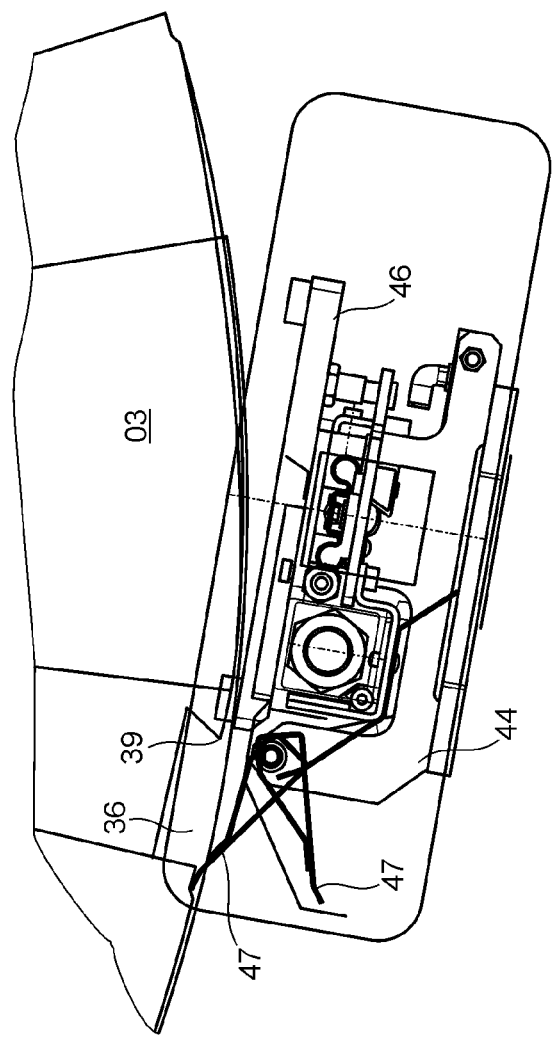
FIG. 11 shows a cross-sectional view of the device for horizontal transport of one of the printing blankets at a time, as shown in FIG. 9, with a deployed spatula for removing a used printing blanket from the segmented wheel.
Figure 12:
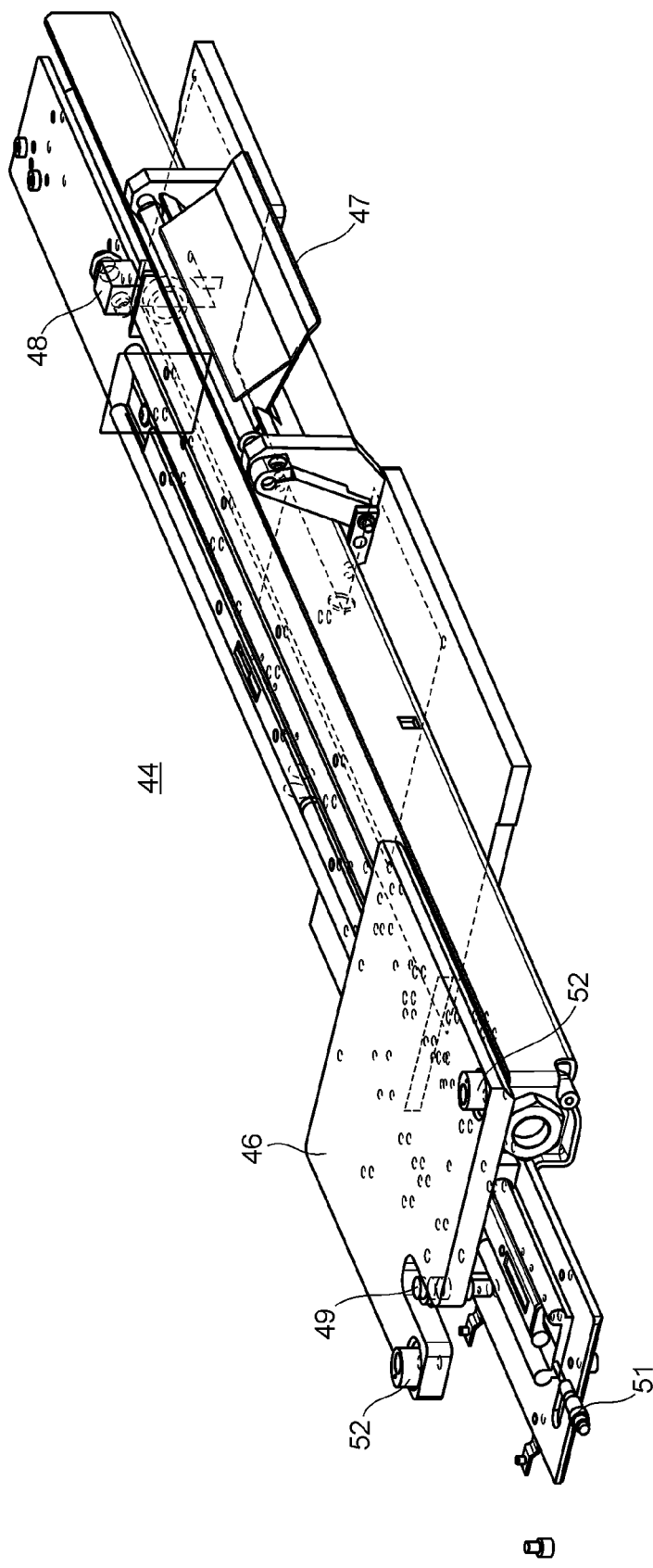
FIG. 12 shows a perspective view of the device for horizontal transport of one of the printing blankets at a time, as shown in FIG. 9, with the deployed spatula.

The device for automatically changing the printing blankets 33 is preferably modular in construction and includes as modules, as shown by way of example in FIGS. 7 to 12, e.g. a magazine 42 for a plurality of printing blankets 33, e.g. up to twelve (FIG. 7), along with a device 43 for vertical transport of the aforesaid magazine 42 (FIG. 8) and a device 44 for transporting one of printing blankets 33 horizontally between magazine 42 and a mounting position on segmented wheel 03 (FIG. 9). FIG. 10 shows the magazine 42 in its operating state located on the device 43 provided for its vertical transport. Magazine 42 includes, in a preferably cuboid housing, a plurality of compartments stacked vertically, in each of which a single printing blanket 33 is or at least can be stored on its back, i.e. lying on its substrate, preferably in a horizontal alignment, wherein in the housing, e.g. at least as many compartments are provided as the number of segments 32 for printing blankets 33 located on the circumference of the assigned segmented wheel 03. Each of the compartments is open, e.g. on at least one of its longitudinal sides, to enable a respective printing blanket 33 to be inserted into or removed from the open side of the respective compartment. This magazine 42 preferably is or at least can be mounted, as a module that can be easily replaced, e.g. without the use of tools, on or at a support of the device 43 for vertical transport of said magazine 42. The device 43 for the vertical transport of magazine 42 is configured to carry out, e.g. a lifting movement, with the vertical travel path measuring, e.g. about 200 mm. The lifting movement of the device 43 for vertical transport of magazine 42 is carried out, e.g. by means of a trapezoidal threaded spindle, preferably driven by an electric motor. To transport the individual printing blankets 33 between magazine 42 and a mounting position on a segment 32 of segmented wheel 03, a device 44 for transporting these printing blankets 33 horizontally is provided. This device 44 for transporting printing blankets 33 horizontally has, e.g. a carriage 46 that is movable bidirectionally, in particular linearly, between two end points, with carriage 46 transporting or at least being capable of transporting a single printing blanket 33 at a time. A printing blanket 33 removed automatically from magazine 42 is transported on carriage 46, preferably lying on its back, to a mounting position, e.g. located beneath segmented wheel 03, where it is received by a segment 32 of segmented wheel 03. A printing blanket 33 to be removed from a segment 32 of segmented wheel 03 is preferably peeled off of the segment 32 in question by means of a spatula 47 which is or at least can be set against the segment 32 in question, and is transported, e.g. lying on carriage 46, from its removal position on the circumference of segmented wheel 03 to magazine 42, wherein in the preferred embodiment, the spatula 47, which is set at an acute angle or tangentially against the segment 32 in question of segmented wheel 03, combined with a rotational movement of segmented wheel 03 directed toward the spatula 47, lifts the metal substrate of the printing blanket 33 in question, held in particular magnetically on the circumference of segmented wheel 03, off of the segment 32 in question, and thus off of the periphery of said segmented wheel 03. In FIG. 11, spatula 47 is shown in both an operating position in which it is set against the relevant segment 32 of segmented wheel 03, and in a parked operating position, these operating positions being occupied alternately.

The replacement or changing of at least one of the printing blankets 33 arranged on the circumference of segmented wheel 03 is then preferably carried out as follows:

Segmented wheel 03 conveys, by means of its rotation, a printing blanket 33 which is arranged on the circumference of said wheel and is to be removed, into an angular position at which a removal of said printing blanket 33 can be carried out by means of the device for automatically changing the printing blankets 33. Carriage 46 of the device 44 for transporting printing blankets 33 horizontally travels along its travel path up to the end point which is closest to the removal point of the printing blanket 33 to be removed. This position of carriage 46 is preferably monitored by sensory elements and/or by a first switching element 48, e.g. by means of an inductive or capacitive proximity switch. Spatula 47 is then preferably set against the trailing edge 37, in the direction of rotation of segmented wheel 03, of the metal substrate of the relevant printing blanket 33 to be removed. By rotating segmented wheel 03 at least briefly in the direction opposite its direction of rotation used during the printing process, the printing blanket 33 to be removed, which is preferably held magnetically on the circumference of segmented wheel 03, is peeled off of the circumference of said segmented wheel 03, i.e. the metal substrate of printing blanket 33 is lifted away from its position resting on segmented wheel 03. Spatula 47 is then moved away from the circumference of segmented wheel 03. The printing blanket 33 that has been detached from the relevant segment 32 of segmented wheel 03 then either drops by virtue of gravity directly into a magazine for worn printing blankets 33 or is transported to said magazine for worn printing blankets by means of carriage 46 of the device 44 for transporting printing blankets 33 horizontally.

A new printing blanket 33 glued to a metal substrate is loaded in at least one compartment, preferably in each of the compartments of the magazine 42 provided for a plurality of new printing blankets 33, and said magazine 42 is preferably located in a raised upper position by means of the device 43 for vertical transport thereof. The carriage 46 of the device 44 for horizontally transporting one printing blanket 33 at a time between magazine 42 and the mounting position on segmented wheel 03 is situated beneath the compartment that contains the new printing blanket 33. The device 43 for vertical transport lowers this magazine 42, thereby placing the new printing blanket 33 onto carriage 46 of the device 44 for horizontal transport. The process is monitored, preferably by sensory means and/or by a second switching element 49, e.g. by means of an inductive or capacitive proximity switch, to determine whether the new printing blanket 33 has actually been placed on carriage 46 of the device 44 for horizontal transport. If not, an error message is issued. Otherwise, i.e. if no error is detected, carriage 46 of the device 44 for transporting printing blankets 33 horizontally moves along its travel path up to the end point closest to the mounting position for the new printing blanket 33, with this position of carriage 46 in turn being monitored, preferably by sensory means and/or by a third switching element 51, e.g. by means of an inductive or capacitive proximity switch. Segmented wheel 03 is also already located in an angular position suitable for receiving the new printing blanket 33, with this angular position being located, e.g. at or near the bottom of segmented wheel 03. In the preferred embodiment, the position of the new printing blanket 33 is aligned at least true to register by said printing blanket abutting against at least stop 52, before being mounted on the circumference of segmented wheel 03. For moving carriage 46 of the device 44 for transporting printing blankets 33 horizontally, a drive is provided, said drive being embodied, e.g. as a compressed air cylinder. To mount the new printing blanket 33 on the circumference of segmented wheel 03, said segmented wheel 03 rotates in the direction of rotation used during the printing process, thereby drawing the new printing blanket 33 up onto its circumference. Carriage 46 of the device 44 for transporting printing blankets 33 horizontally is then moved back to the magazine 42 for the plurality of new printing blankets 33, to retrieve another new printing blanket 33, if necessary.

To reduce makeready times, it is advantageous to configure a device for printing on hollow bodies 01 such that said device includes a segmented wheel 03 which is rotatable about a rotational axis 34, wherein segmented wheel 03 has a plurality of segments 32 in a row along its circumference, each for receiving one printing blanket 33, wherein at least one of the printing blankets 33 located on one of the segments 32 is arranged to roll or at least to be capable of rolling along the hollow body 01 to be printed on. In said device, a plurality of printing units are provided, wherein at least one of the printing units is or at least can be thrown onto at least one of the printing blankets 33 arranged on the circumference of segmented wheel 03. At least one of the printing units includes a printing forme cylinder 04, wherein in association with the relevant printing forme cylinder 04, a plate changer 14 for automatically changing a printing forme is located on said printing forme cylinder 04, and wherein in association with segmented wheel 03, a device for automatically changing at least one of the printing blankets 33 arranged on the circumference of said segmented wheel 03 is provided. Said plate changer 14 preferably has a bearing surface 16, onto which the printing forme that is or will be arranged on printing forme cylinder 04 is or at least can be placed, said bearing surface 16 being movable bidirectionally along a transport path between at least two defined positions. The printing forme to be supplied to the printing forme cylinder 04 in question is held, e.g. by a magnetic holding force on the bearing surface 16 of plate changer 14. The device for automatically changing the printing blankets 33 is modular, in particular, and includes as modules a magazine 42 for a plurality of printing blankets 33, along with a device 43 for vertically transporting said magazine 42, and a device 44 for horizontally transporting one of the printing blankets 33 at a time between magazine 42 and one of the segments 32 of segmented wheel 03. Magazine 42 has a plurality of vertically stacked compartments, in each of which a single printing blanket 33 is or at least can be stored, within a housing. Each of the printing blankets 33 is preferably stored lying on its back and/or in a horizontal alignment in magazine 42. Device 43 for vertically transporting magazine 42 is configured to execute, e.g. a lifting movement, and/or device 44 for transporting printing blankets 33 horizontally has a carriage 46 which is movable bidirectionally between two endpoints, wherein a single printing blanket 33 is or at least can be transported at a time by carriage 46. Plate changer 14 and the device for automatically changing the printing blankets 33 are each controlled, e.g. by a control unit, wherein plate changer 14 and the device for automatically changing printing blankets 33 are active, e.g. at the same time, i.e. each carries out its respective changing of a printing forme or a printing blanket 33 during the same interruption in the production process being run on said device for printing on hollow bodies 01. The printing forme to be arranged on printing forme cylinder 04 is preferably arranged on bearing surface 16 of plate changer 14 true to register with respect to its mounting position on printing forme cylinder 04, and/or the printing blanket 33 to be arranged on the periphery of segmented wheel 03 is arranged on the carriage 46 of the device 44 for transporting printing blankets 33 horizontally in the correct position with respect to its mounting position on a segment 32 of segmented wheel 03. An inking unit 06 for transporting printing ink to printing forme cylinder 04 is preferably embodied as a short inking unit that includes an anilox roller 08.

With respect to a device for printing on hollow bodies 01, which includes a segmented wheel 03 that is rotatable about a rotational axis 34, wherein the segmented wheel 03 has a plurality of segments 32 in a row along its circumference, each for receiving a printing blanket 33, wherein at least one of the printing blankets 33 arranged on one of the segments 32 is arranged rolling or at least capable of rolling along the hollow body 01 to be printed, wherein every two adjacent segments 32 are separated from one another by a recess 36 aligned parallel to the rotational axis 34 of segmented wheel 03, it is also advantageous for each of the printing blankets 33 to be disposed on a plate-shaped metallic substrate, wherein the substrate along with the printing blanket 33 disposed thereon is or at least can be arranged as such, and replaceable in its entirety, on one of the segments 32 of segmented wheel 03, wherein the substrate arranged on one of the segments 32 of segmented wheel 03 is held on this segment 32 in a form-fitting and/or in a force-fitting connection. Each substrate of a printing blanket 33 is bent, preferably at an acute angle, at its leading edge 37 in the direction of rotation of segmented wheel 03, wherein when said substrate is located in the operating position on a segment 32 of segmented wheel 03, this bent edge 38 is placed at a leading edge 39, in the direction of rotation of segmented wheel 03, of the appropriate recess 36 formed on the circumference of segmented wheel 03, wherein the bent edge 38 of the substrate is or at least can be arranged in a form-fitting connection on this edge 39 of recess 36. The plate-shaped metallic substrate is embodied in particular as flexible, and together with the printing blanket 33 arranged on it forms, e.g. a metal printing blanket. The substrate arranged on one of the segments 32 of segmented wheel 03 is held on this segment 32 by a magnetic force. Eight to twelve segments 32, for example, each for receiving one printing blanket 33, are arranged in a row along the circumference of segmented wheel 03. Assigned to segmented wheel 03, e.g. a device for automatically changing printing blankets 33 is provided, wherein the device for automatically changing printing blankets 33 is preferably modular in construction, and includes as modules a magazine 42 for a plurality of printing blankets 33 along with a device 43 for vertical transport of the aforementioned magazine 42 and a device 44 for horizontal transport of one of the printing blankets 33 at a time between magazine 42 and one of the segments 32 of segmented wheel 03. Magazine 42 has in particular a plurality of compartments stacked vertically within a housing, in each of which a single printing blanket 33 is or at least can be stored. The housing of magazine 42 contains e.g. at least as many compartments as the number of segments 32 for printing blankets 33 on the circumference of the associated segmented wheel 03. In the preferred embodiment, the device 43 for vertically transporting magazine 42 is configured to execute a lifting movement, and/or device 44 for transporting printing blankets 33 horizontally has a carriage 46 which is movable bidirectionally between two endpoints, wherein a single printing blanket 33 is or at least can be transported at a time by carriage 46.

This also results in a method for operating a device for printing on hollow bodies 01 which has a segmented wheel 03, wherein a printing blanket 33 is arranged on at least one segment 32 of the segmented wheel 03, which has a plurality of segments 32 one behind the other on its circumference, wherein when the segmented wheel 03 rotates, at least one printing blanket 33 arranged on one of the segments 32 rolls along the hollow body 01 to be printed on, wherein a device for automatically changing printing blankets 33, assigned to segmented wheel 03, in response to a command issued to its control unit, automatically removes the printing blanket 33 to be arranged on the relevant segment 32 of the segmented wheel 03 from a magazine 42, and transports it to the segment 32 in question of segmented wheel 03. The device for automatically changing printing blankets 33 has a device 44 for horizontally transporting printing blankets 33, with a movable carriage 46, wherein each of the printing blankets 33 to be transported is transported lying on carriage 46. A printing blanket 33 lying on carriage 46 is preferably arranged in the proper position with respect to a mounting position on one of the segments 32 of segmented wheel 03. A plurality of printing blankets 33 in particular are stored in magazine 42, and these printing blankets 33 are placed individually, one after the other, on carriage 46 of the device 44 for transporting printing blankets 33 horizontally, and are transported in succession to one of the segments 32 of segmented wheel 03. A printing blanket 33 to be arranged on one of the segments 32 of segmented wheel 03 is arranged on the segment 32 in question, in particular by means of a form-fitting connection produced between the relevant segment 32 and the printing blanket 33 by a rotation of this segmented wheel 03. A printing blanket 33 arranged on one of the segments 32 of segmented wheel 03 is preferably held on the segment 32 in question, e.g. by a magnetic force connection. A printing blanket 33 that has been removed from one of the segments 32 of segmented wheel 03 is likewise preferably transported away from the segmented wheel 03 in question by the device 44 for transporting printing blankets 33 horizontally. It is preferably provided that the device 44 for transporting printing blankets 33 horizontally alternatingly transports a printing blanket 33 that has been removed from one of the segments 32 of segmented wheel 03 away, and transports a new, i.e. unused printing blanket 33 from magazine 42 to an unoccupied segment 32 of segmented wheel 03, i.e. to a segment 32 on which no printing blanket 33 is currently arranged. A switching element 49 monitors the process, e.g. to determine whether a printing blanket 33 removed or to be removed from magazine 42 has actually been placed on carriage 46 of the device 44 for horizontal transport, and/or whether it has been placed in the proper position.

FIG. 14 again shows a perspective view of segmented wheel 03 of the device for printing on hollow bodies 01, in which a plurality of segments 32, e.g. twelve segments, each for accommodating one printing blanket 33, are arranged in a row along the circumference of said segmented wheel 03. This segmented wheel 03 is preferably made of a casting material, e.g., cast iron, and has a weight of, e.g., more than 500 kg, in particular approximately 1,000 kg or more. Segmented wheel 03 has an outer diameter ranging from 1,400 mm to 1,600 mm, for example. Segmented wheel 03 is mounted on its shaft 53 in a frame 66 of this device for printing on hollow bodies 01, preferably at both ends of said shaft, e.g. each end being mounted in particular in double-row roller bearings 63, and the rotation of the segmented wheel is driven by a drive. Said drive for driving the rotation of segmented wheel 03 is configured as an electric motor 58 having a stator 61 and a rotor 62 with a hollow shaft 54, wherein the hollow shaft 54 is or at least can be arranged coaxially with shaft 53 of segmented wheel 03. In the condition in which it is disposed in the device for printing on hollow bodies 01—as shown in the sectional view of FIG. 16—shaft 53 of segmented wheel 03 projects into the installation space of motor 58, and shaft 53 of segmented wheel 03 and rotor 62 of motor 58 are connected rigidly to one another. Segmented wheel 03 is preferably connected rigidly to its shaft 53 at both ends, e.g. by means of clamping elements 67, and is thereby secured to shaft 53. The motor 58 provided for driving the rotation of segmented wheel 03 is preferably configured as a high-pole electrical direct drive having a pole number greater than twenty and/or is configured as a permanently energized brushless DC motor and is illustrated perspectively by way of example in FIG. 15. Said motor 58 has, e.g., a cooling device or is at least connected to such a device, said cooling device being configured as a liquid cooling system. FIG. 15 shows two ports for this liquid cooling system, formed on housing 59 of motor 58, specifically one port for coolant inflow 56 and another port for coolant outflow 57. In an advantageous embodiment, this motor 58 is configured as a torque motor. A preferably digital control unit for controlling or regulating said motor 58 is provided, wherein the control unit adjusts or at least is capable of adjusting a position on the circumference of this segmented wheel 03 relative to a position on the lateral surface of a hollow body 01 to be printed, preferably with a positioning accuracy of less than 0.1 mm, by positioning shaft 53 of segmented wheel 03 in the stator of motor 58. Likewise provided, e.g. on the end of shaft 53 opposite motor 58, is a rotary encoder 64, wherein said rotary encoder 64 has a high angular resolution, e.g. of 27 bits, and detects an angular position of shaft 53 of segmented wheel 03 and provides a measured value that corresponds to the angular position of shaft 53 of segmented wheel 03 to the control unit that controls or regulates motor 58. Motor 58 and/or the rotary encoder are preferably each connected via a data bus, in particular a control bus, to the control unit that controls or regulates motor 58.

The aforementioned embodiment of the rotary drive of segmented wheel 03 has the advantage that said drive is configured as decentralized as well as gearless and clutchless. This drive of segmented wheel 03 is therefore backlash-free and compact. In conjunction with the control unit of said drive, a position on the circumference of said segmented wheel 03 relative to a position on the lateral surface of a hollow body 01 to be printed can be adjusted easily with a positioning accuracy of less than 0.1 mm, which has a very beneficial effect on the achievable print quality. In conjunction with the double-row bearing of segmented wheel 03, a highly precise concentricity of said segmented wheel 03 likewise results, thereby ensuring a uniform transfer of ink from the respective inking units 06 to the relevant printing blankets 33 arranged on the circumference of segmented wheel 03. With the rotary drive for the segmented wheel 03 described here, a high acceleration and thus short run-up times of 10 seconds or less can be realized for said segmented wheel 03. Furthermore, the proposed drive for segmented wheel 03 has the advantage of being low-noise and low-maintenance. Overall, this results in a highly efficient drive for segmented wheel 03.

Figure 14:
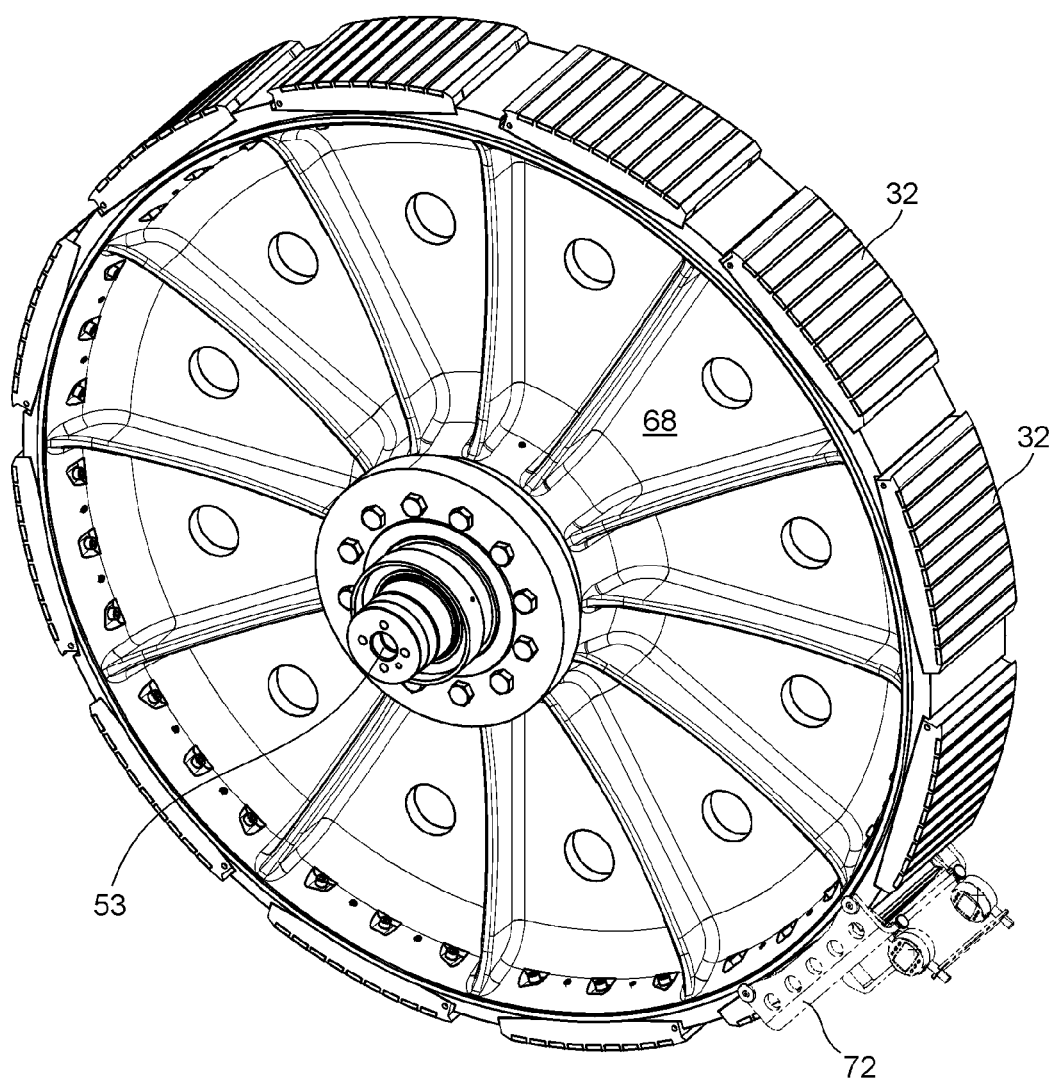
FIG. 14 shows a perspective, detailed representation of the segmented wheel along with its shaft.
Figure 15:
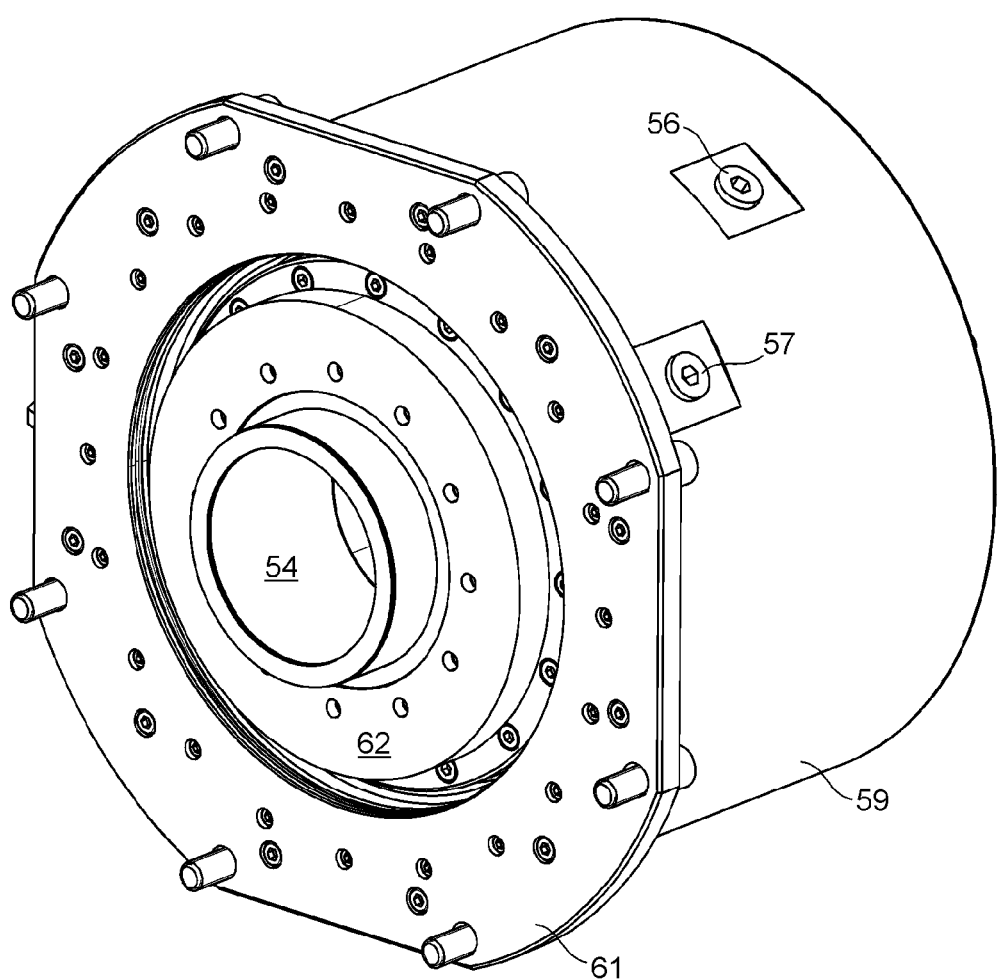
FIG. 15 shows a perspective, detailed representation of the drive for driving the rotation of the segmented wheel.
Figure 16:
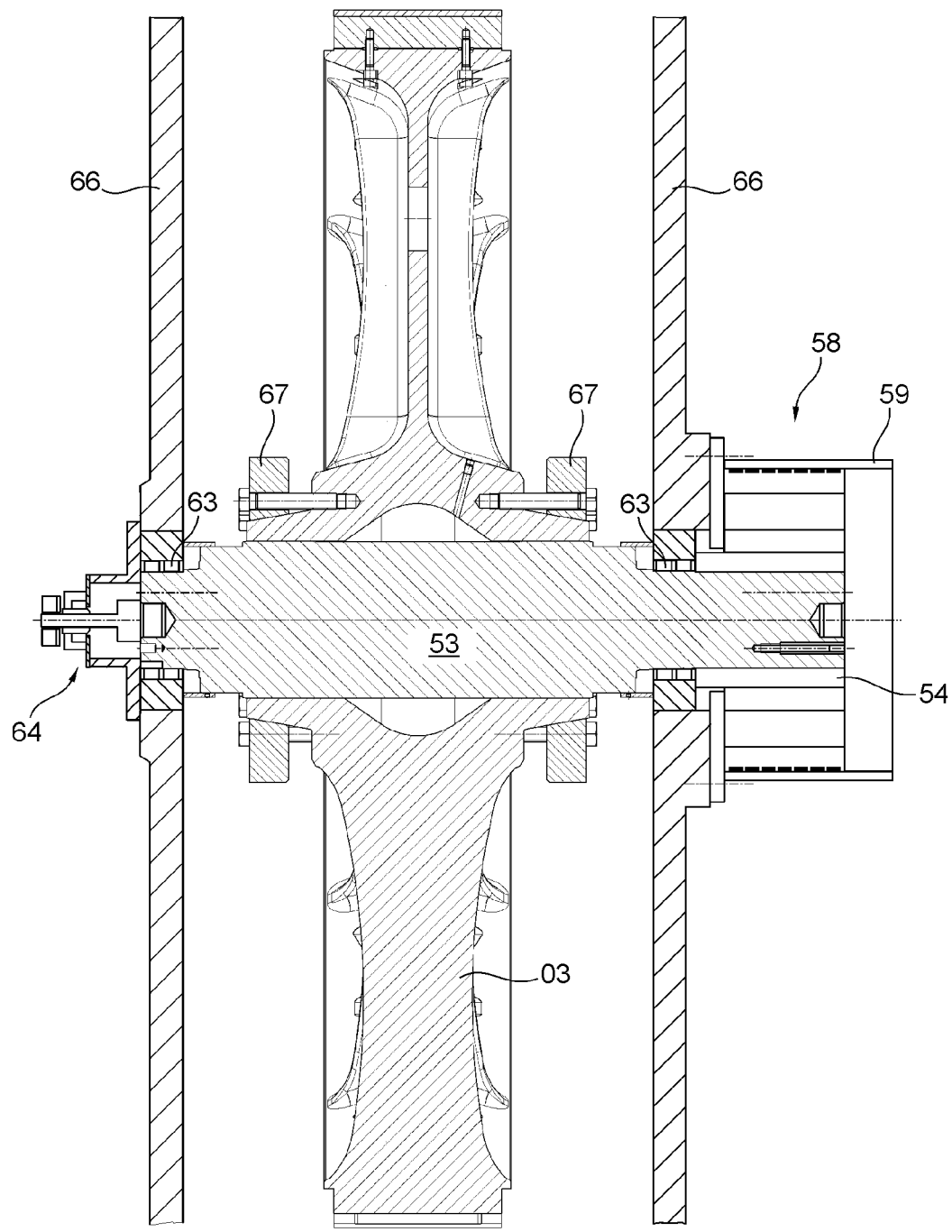
FIG. 16 shows a sectional view of the segmented wheel with its drive, in the condition as arranged in the device for printing on hollow bodies.

FIG. 17 again shows the segmented wheel 03 already described in conjunction with FIGS. 14 and 16, but here in a particularly advantageous embodiment. Segmented wheel 03, which during the printing process is mounted in frame 66 of the device for printing on hollow bodies, has a main body 68 preferably produced from a metallic material, e.g., from a welded structure or from cast iron, with a plurality of segments 32, e.g. twelve, being arranged or at least arrangeable, in particular spaced from one another, along the circumference of main body 68, each at a joining point 69. Segmented wheel 03 therefore is not configured as a single integral part on which segments 32 are already molded, rather each of these segments 32 represents a separate machine element that can be separated from main body 68 and is arranged changeably on main body 68. Each of these segments 32 is suitable—as previously in the same manner—for receiving a printing blanket 33 in the manner described above.

One advantage of changeable segments 32 on segmented wheel 03 is that, e.g. when converting the machine assembly to produce hollow bodies 01 of a different format from the current production run, e.g., to cans having a shorter or longer can height and/or a different can diameter, an adjustment in the format of the printing blankets 33 required for printing can be carried out faster and more easily. In a machine assembly having a segmented wheel 03 onto which segments 32 are already molded, in order to convert the production process to hollow bodies 01 of a different format, the entire segmented wheel 03 must be replaced; considering the typical size of segmented wheel 03 with an outer diameter in the range of 1,400 mm to 1,600 mm, for example, and/or the typical weight of more than 500 kg, in particular more than 1,000 kg, for example, this requires considerable effort and unreasonably long setup times.

To produce a printed image of high print quality on hollow bodies 01 in the printing process, a segmented wheel 03 must meet very strict requirements in terms of concentricity, meaning that such a segmented wheel 03 must be machined very accurately, i.e., with low permissible manufacturing tolerances. With a segmented wheel 03 onto which segments 32 are already molded, this is expensive and requires great effort due to the relatively large outer diameter of 1,400 mm to 1,600 mm, for example. What can be accomplished during an initial production process by means of relatively rare and costly large-scale machining equipment is possible in the event of damage to the segments 32 or other parts of segmented wheel 03 only by means of highly costly repair measures that are extremely difficult to perform in the machine assembly, such as leveling, cutting, welding and grinding the damaged area, or by replacing the entire segmented wheel 03. For the operator of such a machine assembly, in addition to high repair costs this means long production downtimes, since the entire machine assembly is shut down for the duration of the repairs. Finally, with integral segmented wheels 03, no variation in the materials used, e.g. to decrease the inertia of the segmented wheel 03 in question, is possible.

A segmented wheel 03 having a plurality of segments 32 arranged along the circumference of its main body 68, in particular spaced from one another, each at a joining point 69, and thus changeable, simplifies manufacturing of the segmented wheel 03 in question, and its modular construction facilitates its adaptation to different formats dependent on the respective production process, and if necessary, facilitates the repair of damaged areas on said segmented wheel 03, in particular on the segments 32 thereof, to be performed in the machine assembly.

Figure 17:
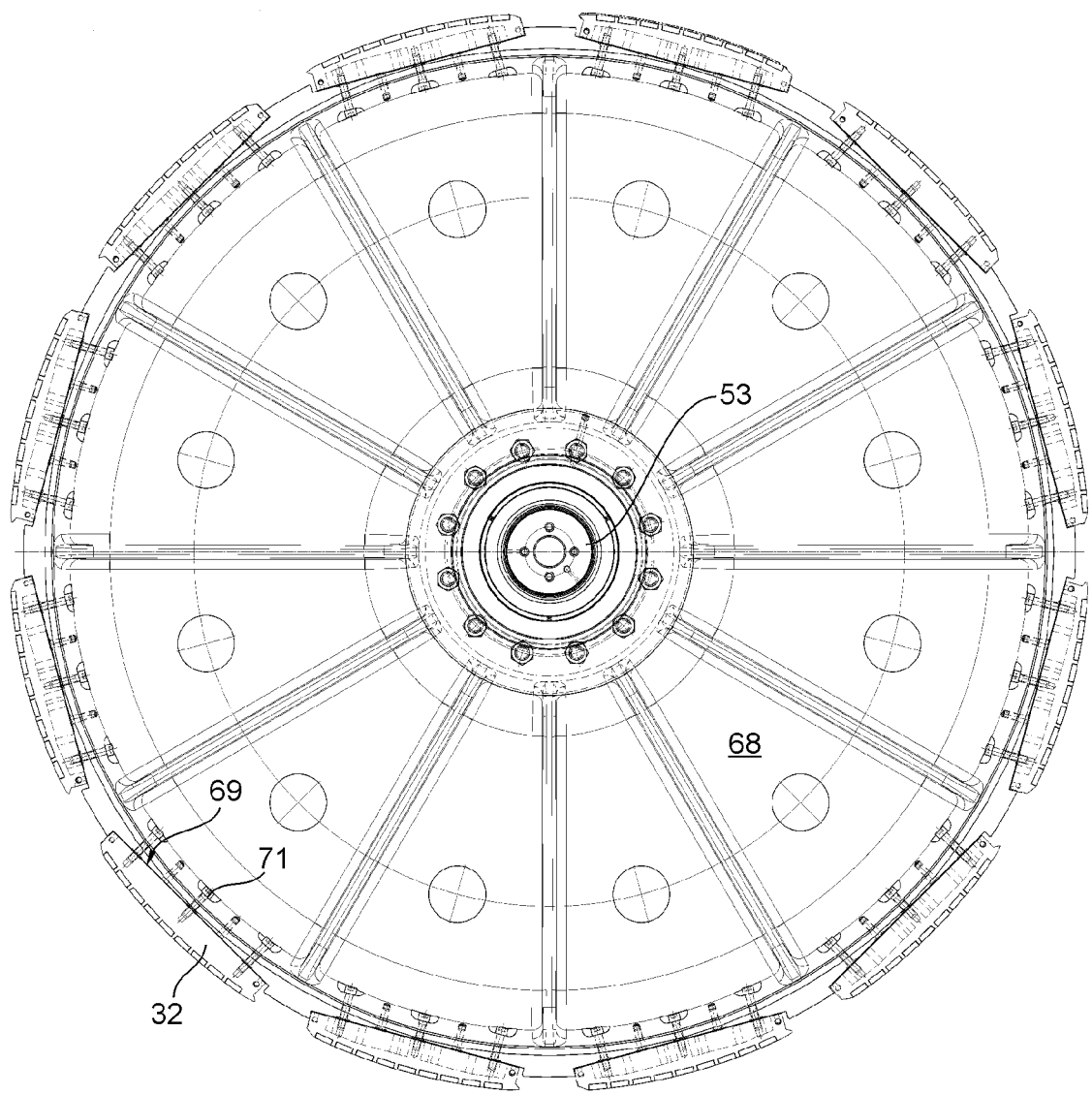
FIG. 17 shows the segmented wheel with exchangeable segments.
Figure 18:
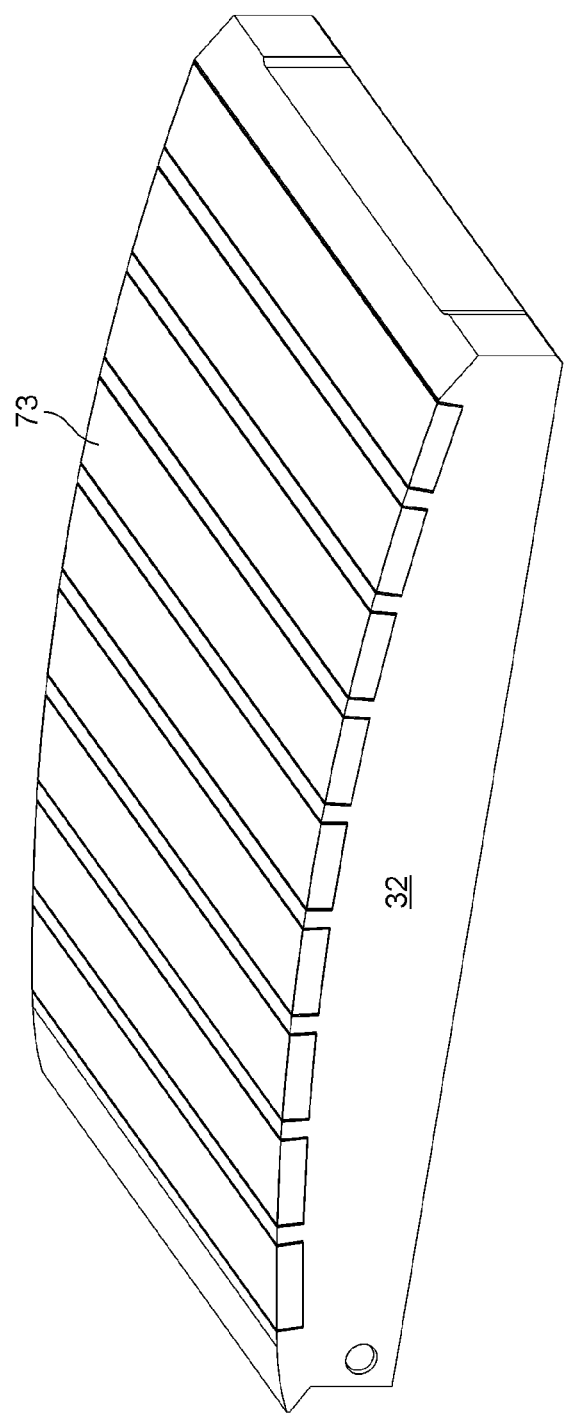
FIG. 18 shows a single changeable segment.

In the embodiment of segmented wheel 03 shown in FIG. 17, the individual, changeable segments 32 are preferably configured as finished (FIG. 18). This means that the finished segments 32 need to correspond with high precision to the desired outer diameter of the relevant segmented wheel 03 only in terms of their respective surface curvature. The remaining geometries play a subordinate role in terms of tolerances. In the main body 68 of segmented wheel 03, the manufacturing tolerances of the outer geometry are likewise subordinate in importance. The individual segment 32 shown by way of example in FIG. 18 has, e.g., at least one holding magnet 73 for holding a printing blanket 33 having a magnetizable metal substrate on the circumference of the segmented wheel 03, in particular in the proper position, after said segment 32 has been mounted on the main body 68 of said segmented wheel 03.

The required high accuracy in terms of the concentricity and radius of the respective running surfaces of the relevant printing blankets 33 is achieved by a process of aligning the segments 32, performed, e.g. with the aid of a rider gauge 72 that is movable in particular along the circumference of the segmented wheel 03 (FIG. 14), while main body 68 of segmented wheel 03 is disposed in the machine assembly, and is fixed, e.g. by casting a compensation gap. At each relevant joining point 69 between a respective segment 32 and the main body 68, a compensation gap is formed, with a joint face coating arranged in the relevant compensation gap, said joint face coating preferably being formed as, e.g., a low-viscosity casting material or as a filler compound. Each respective segment 32 is thus cast in particular to fit precisely at its joining point 69 with main body 68 of segmented wheel 03. At the joining point 69 in question, the compensation gap has a gap width of, e.g., at least 1 mm up to, e.g., 5 mm. In addition, each of the segments 32 is fixed to main body 68 and/or is detachably connected to main body 68, e.g. by means of at least one connecting element 71. The at least one connecting element 71 that connects each respective segment 32 to the main body 68 of segmented wheel 03 is configured in each case, e.g., as a cylindrical screw or as a tapered pin.

A joint face coating is used to adapt and fit machine parts with the most stringent requirements in terms of precision. It allows adaptations within the μm range without costly mechanical preliminary treatment or post-treatment. It has a high static compression resistance of, e.g., 100 N/mm$^2$ and/or a contact area ratio of, e.g., 100%. A joint face coating has very high adhesive force and cures without technically relevant shrinkage. A joint face coating of this type is available, e.g., from SKC Gleittechnik GmbH, D-96469 Roedental.

FIG. 19 shows, in a simplified and schematic diagram, a device for printing on hollow bodies 01, in which multiple hollow bodies 01 are fed sequentially by a conveyor device 74 in the transport direction indicated by an arrow to a conveyor wheel 76, and from there to a mandrel wheel 02, and thereafter to a segmented wheel 03. Conveyor wheel 76 and mandrel wheel 02 are typically components of the decorator and form an apparatus for feeding the hollow bodies 01 sequentially to the circumference of the segmented wheel 03. A plurality of carrier elements 80, e.g. eight or ten such carrier elements 80, are arranged on the circumference of conveyor wheel 76, and a plurality of holding devices 05, e.g. 24 or 36 such holding devices 05, each for receiving one hollow body 01 to be printed on in cooperation with the segmented wheel 03, are arranged on the circumference of mandrel wheel 02. Arranged along the circumference of segmented wheel 03 are a plurality of printing units, e.g. eight, ten or twelve, each comprising a plate cylinder 04 and an inking unit 06 and each preferably printing in a different printing ink from the others, wherein each inking unit 06 is preferably configured as a short inking unit and has, e.g. only a single inking roller 07 and one anilox roller 08. On the circumference of segmented wheel 03, a plurality of printing blankets 33, e.g. 12, are arranged one behind the other and preferably equidistant, wherein a mandrel wheel 02 having 24 holding devices is set to rotate at half the speed as compared with a segmented wheel 03 having 12 segments 32. Each of the printing blankets 33 arranged on the circumference of the segmented wheel 03, each on one segment 32, is configured, e.g. as a metal printing blanket and is held on the relevant segment 32 of the segmented wheel 03 preferably by a magnetic force. Segmented wheel 03 preferably has a main body 68, with the plurality of segments 32, e.g. twelve, being arranged or at least arrangeable, in particular spaced from one another, along the circumference of main body 68, each at a joining point 69. In the preferred embodiment, therefore, segmented wheel 03 is not configured as a single integral part on which segments 32 are already molded, rather each of the segments 32 forms a separate machine element that can be removed from the main body 68, and each is arranged exchangeably on main body 68, e.g. by releasing at least one connecting element 71. The carrier elements of conveyor wheel 76 are formed, e.g. by recesses on its circumference, with each recess being able to receive only a single hollow body 01 at a given point in time and convey said hollow body during rotation of the conveyor wheel 76. The receiving of a hollow body 01 in the relevant recess of conveyor wheel 76 is assisted, e.g., by a blower air device 98 arranged in the periphery of conveyor wheel 76, wherein, dependent on the angular position of the conveyor wheel 76, at least one blast of air that impacts the relevant hollow body 01 is released in the direction of the conveyor wheel 76 by the blower air device 98. In an advantageous embodiment, conveyor wheel 76 is configured as a star wheel having a plurality of carrier elements, each in the form of pointed prongs, with a hollow body 01 that is held in a space between adjacent prongs being conveyed during rotation of the star wheel.

Mandrel wheel 02 and conveyor wheel 76 each have their own dedicated drive 77; 78, configured e.g. as a motor, which is separate from the drive 58 of segmented wheel 03, and the drive 58 of segmented wheel 03 and the drive 77 of mandrel wheel 02 and the drive 78 of conveyor wheel 76 are connected to one another for data exchange via a common data bus 79. Said data bus 79 that connects the drives 58; 77; 78, which is preferably digital, is configured, e.g. in a ring topology or in a star topology. A control unit 82 connected to the data bus 79, e.g. configured as a central press controller, uses control data transported via the common data bus 79 to control at least both the drive 78 of the conveyor wheel 76 and the drive 77 of the mandrel wheel 02, and preferably also the drive 58 of the segmented wheel 03 and other drives, in particular all the drives connected to said data bus 79. In a decorator having multiple independent drives connected via a common data bus 79, e.g. the drive 77 of mandrel wheel 02 or the drive 58 of segmented wheel 03 is specified as the master, and therefore each of the remaining drives aligns in terms of its respective rotational behavior as a slave, following the previously specified master. Using the control data for controlling the drive 78 of conveyor wheel 76 and the drive 77 of mandrel wheel 02, at least one pair of discrete angular positions φ1; φ2, consisting of a first angular position φ1 that is or will be assumed by one of the carrier elements on the circumference of the conveyor wheel 76 and a second angular position φ2 that is or will be assumed by one of the holding devices on the circumference of mandrel wheel 02, each at a transfer position 81 where the respective hollow body 01 is transferred from conveyor wheel 76 to mandrel wheel 02, are permanently set in relation to one another, in each case with respect to this transfer position 81. This means that the angular positions φ1; φ2 that make up the pair of angular positions φ1; φ2 in question remain unchanged with respect to the transfer position 81 during a respective rotation of conveyor wheel 76 and mandrel wheel 02, and this preferably applies to all the carrier elements of conveyor wheel 76 and all the holding devices on the circumference of mandrel wheel 02, which are each to be positioned at the transfer position 81 where the respective hollow body 01 is transferred from conveyor wheel 76 to mandrel wheel 02, at least during a production run on the device for printing on the hollow bodies 01. The control data transported via the data bus 79 to the respective drive 58; 77; 78 preferably include at least the respective speed of the shaft of the drive 58; 77; 78 in question and/or at least one angular position to be assumed by its shaft. These control data thus function, e.g. as a virtual master axis with respect to the decorator in question. The control data transported via the virtual master axis are a reference variable for the axles, which are to be coordinated, of the drives 58; 77; 78 that are connected to said data bus 79. From the control data that determine a position value of the virtual master axis, i.e. the guide value of the virtual master axis, a target position value for each slave axis provided by the drives 58; 77; 78 is calculated. At least the drive 77 of mandrel wheel 02 and the drive 58 of segmented wheel 03 and optionally also the drive 78 of conveyor wheel 76 are each configured as an electric motorized direct drive that is controlled in terms of its respective speed and/or is closed-loop position controlled by control unit 82. The drive 58 of segmented wheel 03 is configured, e.g. as a torque motor. In an advantageous embodiment, at least the respective drives 58; 77; 78 of conveyor wheel 76, mandrel wheel 02, and segmented wheel 03 are each assigned their own dedicated drive controller 83, each drive controller being connected to data bus 79, and their own dedicated power unit 84.

The hollow bodies 01, which are each inverted, one at a time in succession, by suction, e.g. by means of a vacuum, onto one of the mandrels of the mandrel wheel 02 and are then held by the relevant mandrel, are rotated both by the rotation of the mandrel wheel 02 and by a rotation that is or at least can be executed independently by the mandrel, since each mandrel is rotatable about its respective longitudinal axis and is thus adjusted or at least adjustable, in particular to a specific circumferential speed. In a preferred embodiment, at least one hollow body 01, preferably multiple hollow bodies 01, each of which is held on one of the mandrels of the mandrel wheel 02, is placed in rotation and is brought to the circumferential speed required for the printing process, e.g. by a preferably continuously revolving acceleration belt 86, which is located, in particular, in the periphery of mandrel wheel 02 and is in physical contact with each of said hollow bodies 01, i.e. by friction, prior to the respective printing of said hollow body by means of at least one of the printing blankets 33 arranged on the circumference of the segmented wheel 03. Said acceleration belt 86 preferably has its own dedicated drive 87, which is separate from the drives 58; 77; 78 of conveyor wheel 76, mandrel wheel 02, and/or segmented wheel 03 but which is also, e.g. connected to the data bus 79, the circumferential speed of the acceleration belt 86 being optionally adjustable. The circumferential speed of the acceleration belt 86 can thus be adjusted and/or modified individually by its drive 87, e.g. for each hollow body 01 depending on the requirements of the printing process. The drive 87 of acceleration belt 86 is also assigned, e.g. its own dedicated drive controller 83 and its own dedicated power unit 84.

At least one processing station arranged in the periphery of mandrel wheel 02 downstream of the printing of hollow body 01 is configured, e.g. as a coating device 88 for coating the outer lateral surface of each printed hollow body 01 and/or specifically in the case of two-part cans, as an edge processing station. The processing station configured as a coating device 88 has a coating applicator roller 89, which is or at least can be thrown onto the lateral surface of at least one of the printed hollow bodies 01 held by mandrel wheel 02. The coating applicator roller 89 of coating device 88 is preferably rotationally driven by its own dedicated drive 91, wherein a hollow body 01 held on mandrel wheel 02 after being printed by means of at least one of the printing blankets 33 arranged on the circumference of segmented wheel 03 is placed in rotation by means of friction by the coating applicator roller 89 driven by drive 91, and is adjusted to a certain circumferential speed, e.g. based on the requirements of the coating process. In particular, the circumferential speed of the hollow body 01 is or at least can be adjusted by the drive 91 of coating applicator roller 89 independently of the drives 58; 77; 78 of conveyor wheel 76, mandrel wheel 02, and/or segmented wheel 03. Advantageously, the drive 91 of coating applicator roller 89 is also assigned its own dedicated drive controller 83 and its own dedicated power unit 84.

In the preferred embodiment, in the periphery of mandrel wheel 02, e.g. at the lower edge thereof, in particular downstream of coating applicator roller 89 of coating device 88 in the direction of transport of hollow body 01, a deceleration belt 96 is provided, the deceleration belt 96 being arranged to decelerate by friction at least one rotating hollow body 01 held on one of the holding devices of mandrel wheel 02. Deceleration belt 96 is preferably driven by its own dedicated drive 97, wherein at least one rotating hollow body 01 that is held on mandrel wheel 02 and is to be decelerated by friction by deceleration belt 96 after being printed by at least one of the printing blankets 33 arranged on the circumference of segmented wheel 03 is adjusted by means of said drive 97 to the circumferential speed required for further transport. This circumferential speed of hollow body 01 is or at least can be adjusted by drive 97 of deceleration belt 96, independently of the drives 58; 77; 78; 91 of conveyor wheel 76 and/or mandrel wheel 02 and/or segmented wheel 03 and/or coating applicator roller 89 of coating device 88. The drive 97 of deceleration belt 96 is preferably also assigned its own dedicated drive controller 83 and its own dedicated power unit 84. The deceleration belt 96 having its own dedicated drive 97 enables an optimal deceleration process of the clamping mandrels prior to receiving the upright hollow bodies 01. It is advantageous or essential particularly at high rotational speeds of the clamping mandrels in conjunction with clamping mandrels for large-volume hollow bodies 01 with a high mass moment of inertia.

Further provided in the direction of transport of the hollow bodies 01 is a conveyor device configured, e.g., as a rotatable transfer wheel 92 for receiving hollow bodies 01 that are held on mandrel wheel 02, which have been printed by means of at least one of the printing blankets 33 arranged on the circumference of segmented wheel 03 and have optionally been coated on their lateral surface, wherein the circumferential speed of transfer wheel 92 is or at least can be adjusted, e.g., by means of a belt drive, preferably dependent on the rotation of conveyor wheel 76, e.g. with the drive 78 of said conveyor wheel 76. A drive of transfer wheel 92 is coupled, e.g. mechanically or electrically, in particular in terms of control, e.g. with the drive 78 of conveyor wheel 76. Alternatively, transfer wheel 92 is rotationally driven by its own dedicated drive, i.e. separate from the other drives 58; 77; 78; 87; 91; 97.

Downstream of transfer wheel 92 in the direction of transport of the hollow bodies 01, a further conveyor device 93 is preferably provided for conveying printed and/or coated hollow bodies 01, e.g. into a dryer, said conveyor device 93 being configured, e.g. as a revolving transport chain 93 having multiple receiving elements, e.g. twenty, each for receiving one of the hollow bodies 01 to be conveyed, and preferably having a dedicated drive 94, in particular a chain drive, said drive 94 preferably being connected at least to the data bus 79 that connects the drives 58; 77; 78 of segmented wheel 03, mandrel wheel 02, and conveyor wheel 76. The drive 94 of said conveyor device 93 is also assigned, e.g. its own dedicated drive controller 83 and its own dedicated power unit 84.

According to the drive concept for a decorator, described here by way of example, at least the drives 58; 77; 78 of segmented wheel 03, mandrel wheel 02, and conveyor wheel 76 are each configured as independent drives and are connected to one another via a common data bus 79. Advantageously, additional independent drives connected to the common data bus 79 are provided in the device for printing on hollow bodies 01, e.g. the drive 87 for acceleration belt 86 and/or the drive 91 for coating applicator roller 89 of coating device 88 and/or the drive 97 for deceleration belt 96 and/or the optional dedicated drive for transfer wheel 92 and/or the drive 94 for transport chain 93. These drives 58; 77; 78; 87; 91; 94; 97 are all controlled by a control unit 82, e.g. configured as a central press controller and connected to the common data bus 79, in each case by means of control data transported via said common data bus 79, wherein said control data preferably include at least the respective speed of the shaft of the relevant drive 58; 77; 78; 87; 91; 94; 97 along with at least one angular position to be assumed by its shaft. The control unit 82 configured as a central press controller is configured, e.g., as a control console belonging to the decorator in question, wherein the control data that are required for the relevant drives 58; 77; 78; 87; 91; 94; 97 can be entered at said control console.

In a preferred embodiment, conveyor wheel 76, mandrel wheel 02, segmented wheel 03, and transfer wheel 92 are synchronized with one another, through the control of their respective drives 58; 77; 78 by means of the control data that are transported via the common data bus 79, in such a way that at a certain point in time, when conveyor wheel 76 is transferring a hollow body 01 to mandrel wheel 02, another hollow body 01 already arranged on mandrel wheel 02 is just being printed by a printing blanket 33 arranged on segmented wheel 03, and another hollow body 01 that has already been printed is being transferred from mandrel wheel 02 to transfer wheel 92.

One advantage of the drive concept that uses independent drives for a decorator instead of a central drive is the very high positioning accuracy that can be achieved, particularly for mandrel wheel 02 and segmented wheel 03, which enables razor sharp printing on the lateral surface of the hollow bodies 01. The separate drive 87 for acceleration belt 86 enables individual control of the rotation of each individual hollow body 01 arranged on a mandrel of the mandrel wheel 02, with a lead or lag in the rotation of each relevant hollow body 01 in relation to a printing blanket 33 arranged on the circumference of segmented wheel 03 being adjusted or at least adjustable as needed. The separate drive 94 for transport chain 93 enables an exact counting of the hollow bodies 01 conveyed and/or a selective discharge of defective hollow bodies 01. The separate drives 77; 78; 94 for devices that are directly involved in the transport of the hollow bodies 01, i.e. in particular conveyor wheel 76, mandrel wheel 02, transfer wheel 92, and/or transport chain 93, offer the advantage that the timing of the various transfer actions for transferring the relevant hollow bodies 01 from one conveyor element to another can be adjusted without mechanical intervention into the respective drive elements.

Advantageously, the motor 11 of the plate cylinder 04 and the motor 12 of the anilox roller 08 of a respective inking unit 06 that cooperates with segmented wheel 03 are also each assigned their own dedicated drive controller 83 and their own dedicated power unit 84, with the relevant drive controller 83, typically together with the associated power unit 84, representing an embodiment of the electronic control unit described above, for example, with which the relevant motor 11 of the plate cylinder 04 and the relevant motor 12 of the anilox roller 08 are each controlled or at least controllable, e.g. in terms of their respective speed. The respective drive controller 83 and the associated power unit 84 are preferably connected via the data bus 79 to the control unit 82 configured as a central press controller, said central control unit 82 being configured, e.g., as the control console belonging to the decorator in question.

In the preferred embodiment, multiple, preferably all of the drives or motors 11; 12; 58; 77; 78; 87; 91; 94; 97 that are connected to the common data bus 79 are each controlled or at least controllable individually and independently of the others. In that case, it is preferably provided that at least one family of characteristics for the respective control of each of the respective motors 11; 12; 58; 77; 78; 87; 91; 94; 97 is stored, e.g. in the central control unit 82 or, e.g. in the drive controller 83 belonging to the respective motor 11; 12; 58; 77; 78; 87; 91; 94; 97. To facilitate a production change, for example, in particular a changeover of the machine arrangement to a production of hollow bodies 01 of a different format, e.g. to cans that have a shorter or taller can height and/or a different can diameter from the current production run, it is advantageous for the respective motors 11; 12; 58; 77; 78; 87; 91; 94; 97 to each be controlled or at least controllable in accordance with synchronized characteristics. This enables the respective motors 11; 12; 58; 77; 78; 87; 91; 94; 97, which are each controlled or at least controllable individually and independently of one another, to be synchronized with one another based on the respective production process, entered or selected in advance, in particular at the central control unit 82, i.e. in particular at the control console. Alternatively, with a drive concept that uses independent drives in each case, it is also possible, e.g. for maintenance or repair or set-up or retooling purposes, for a first subset of the assemblies 02; 03; 04; 08; 76; 86; 89; 92; 93; 96 that are each drivable by one of the motors 11; 12; 58; 77; 78; 87; 91; 94; 97, in particular a single assembly 02; 03; 04; 08; 76; 86; 89; 92; 93; 96 that is driven by one of the motors 11; 12; 58; 77; 78; 87; 91; 94; 97, to be placed in operation individually, i.e. selectively, so that each executes rotational movement while at least one other assembly 02; 03; 04; 08; 76; 86; 89; 92; 93; 96, i.e. a second subset of the assemblies 02; 03; 04; 08; 76; 86; 89; 92; 93; 96 that are each drivable by one of the motors 11; 12; 58; 77; 78; 87; 91; 94; 97, remains idle.

Figure 20:
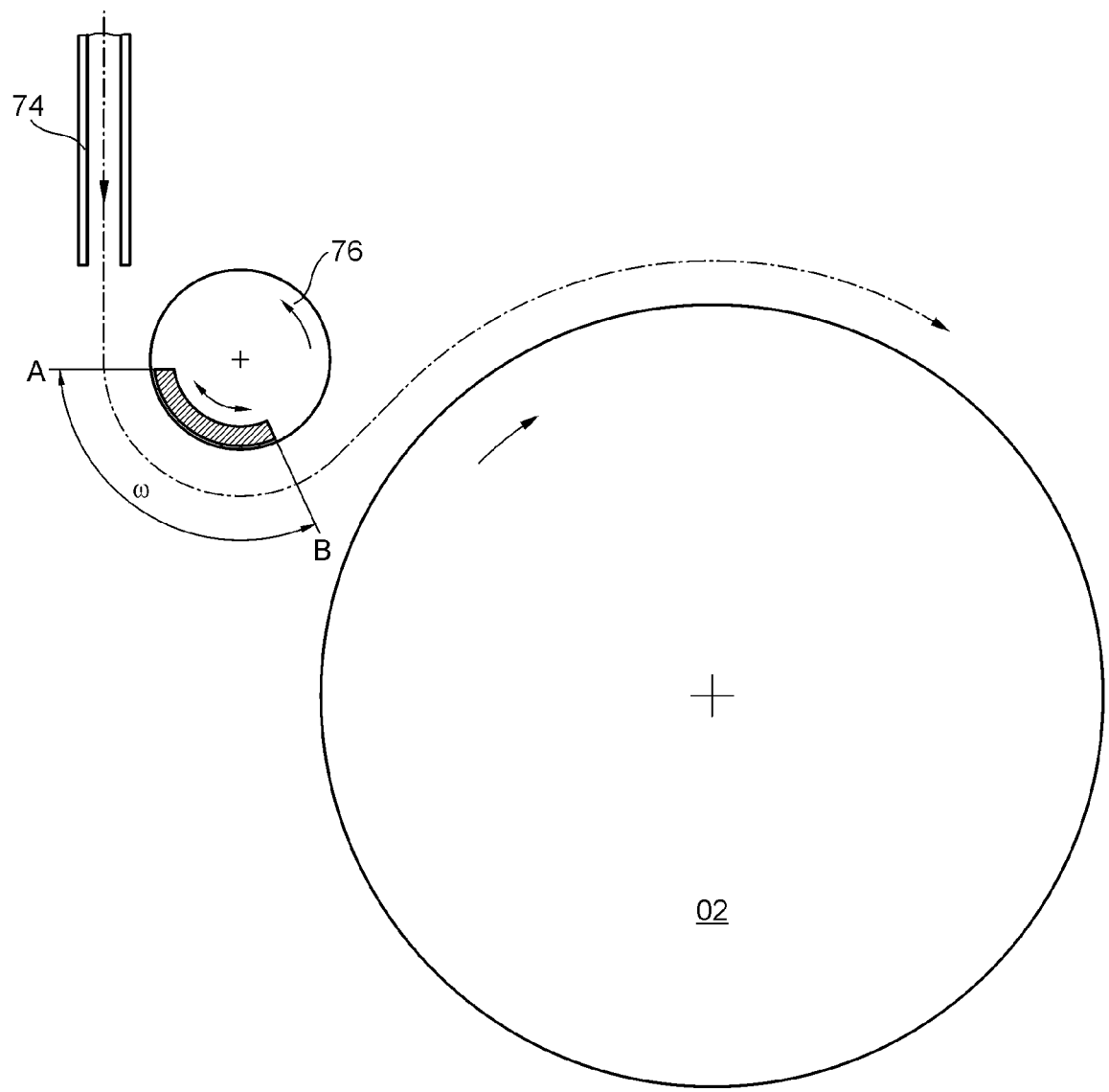
FIG. 20 shows a section from FIG. 19 relating to an infeed of the hollow bodies.

FIG. 20 shows a section from FIG. 19 relating to the feeding of the hollow bodies 01, in which multiple hollow bodies 01 are fed sequentially, by means of conveyor device 74, in the direction of transport indicated by the arrow and along the transport path indicated by the arrow, to conveyor wheel 76 and from there to mandrel wheel 02, the respective direction of rotation of conveyor wheel 76 and mandrel wheel 02 likewise each being indicated by a directional arrow. In its preferred embodiment, conveyor wheel 76 has an angular range w, within which angular range w a suction device 99 integrated into conveyor wheel 76 or at least cooperating with conveyor wheel 76 is active or at least can become active. Suction device 99 is therefore arranged in or on conveyor wheel 76 in such a way that it supports the feeding of a hollow body 01 to be printed to one of the holding devices arranged on segmented wheel 03.

Figure 21:
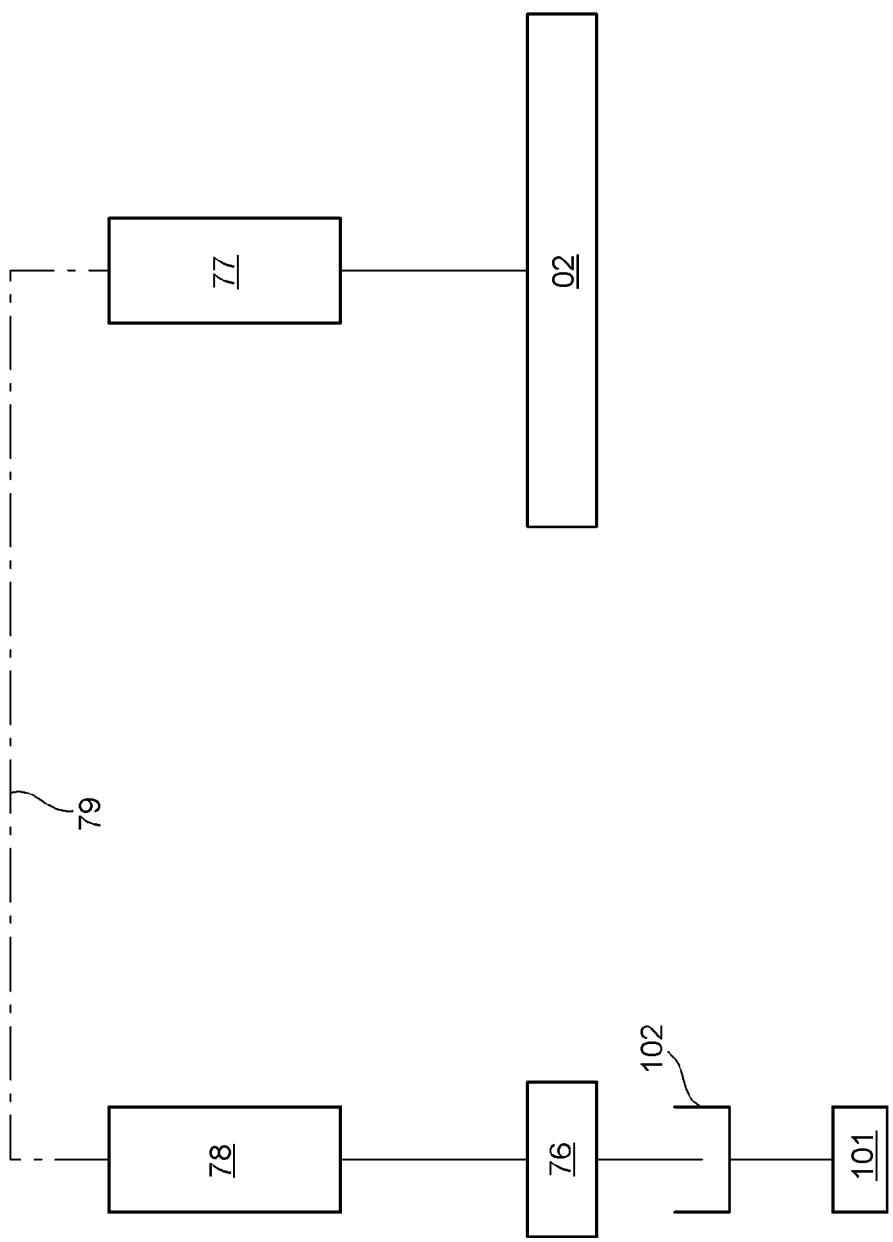
FIG. 21 is a schematic diagram of a drive concept for a conveyor wheel and a mandrel wheel.

FIG. 21 once again shows the drive concept of conveyor wheel 76 and mandrel wheel 02, in a simplified and schematic diagram, in which conveyor wheel 76 is or at least can be driven independently by drive 78, and mandrel wheel 02 is or at least can be driven independently by drive 77, in each case separately from drive 58 of segmented wheel 03. The two drives 77; 78 are connected to data bus 79 via their respective drive controllers 83. The rotational movements executed by these two drives 77; 78 are synchronized with one another using control data communicated via the data bus 79. In a preferred embodiment, a suction pump 101 is or at least can be connected to conveyor wheel 76 via a preferably remotely operable coupling 102, both while the press is running and while the press is idle, i.e. both while conveyor wheel 76 is rotating and while it is stationary. Suction pump 101 and/or coupling 102 can each be controlled or actuated from central control unit 82, i.e. in particular from the control console. In its switched-on operating state, suction pump 101 generates a vacuum within the angular range w traversed by the rotating conveyor wheel 76, by which a hollow body 01 to be conveyed by conveyor wheel 76 to mandrel wheel 02 is received correctly at one of the carrier elements arranged on the circumference of conveyor wheel 76 and, held in this position, is fed to one of the holding devices arranged on the circumference of the mandrel wheel 02. Since the rotational movement of mandrel wheel 02 is synchronized with that of conveyor wheel 76 by the drive control system, a hollow body 01 held by one of the carrier elements of conveyor wheel 76 is fed to one of the holders on the circumference of mandrel wheel 02 highly accurately, i.e. in precisely the correct position.

Figure 22:
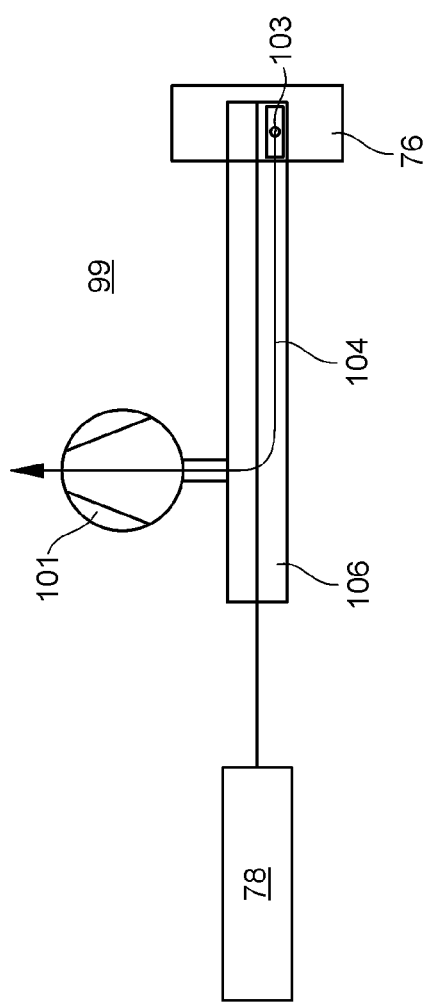
FIG. 22 shows a suction device cooperating with the conveyor wheel.

Details of a suction device 99 that cooperates with conveyor wheel 76 are shown in simplified form in FIG. 22. Conveyor wheel 76 has at least one suction opening 103 on its circumference, preferably in the region of at least one of its carrier elements. An air flow 104 generated, e.g. in a channel 106, by the switched-on suction pump 101 generates a vacuum at the relevant suction opening 103, by means of which a hollow body 01 to be conveyed by conveyor wheel 76 to mandrel wheel 02 is received and held at one of the carrier elements arranged on the circumference of conveyor wheel 76. Suction pump 101 is or will be switched on or switched off, in particular dependent on a respective angular position A; B of the conveyor wheel 76 driven by the drive 78, so that the angular range traversed by the rotating conveyor wheel 76 during the period when suction pump 101 is switched on is the angular range w, within which a hollow body 01 to be conveyed by conveyor wheel 76 to mandrel wheel 02 is held at one of the carrier elements arranged on the circumference of conveyor wheel 76. With an embodiment at least of drive 78 of conveyor wheel 76, e.g., as a motorized direct drive that is controlled in terms of is speed and/or is closed-loop position controlled, the angular range w within which a hollow body 01 to be conveyed by conveyor wheel 76 to mandrel wheel 02 is held at one of the carrier elements arranged on the circumference of conveyor wheel 76, and therefore also the angular position at which a hollow body 01 to be conveyed by conveyor wheel 76 to mandrel wheel 02 is held on the circumference of conveyor wheel 76 and is then transferred to mandrel wheel 02, can be adjusted in increments of e.g. 0.01 mm and thus highly precisely, so that very high positioning accuracy is achieved in the transfer of a hollow body 01 to one of the holders on the circumference of mandrel wheel 02. The direct driving of conveyor wheel 76 enables a highly precise adjustment of the circumferential register of said conveyor wheel 76 with respect to the respective holders on the circumference of mandrel wheel 02. This high positioning accuracy in turn enables hollow bodies 01 that are to be printed in a decorator to be transferred by conveyor wheel 76 to mandrel wheel 02 with great accuracy, even at high production speeds, e.g. of 1,500 to 3,000 hollow bodies 01 per minute, in particular, e.g., of 1,800 to 2,500 hollow bodies per minute, and enables disruptions in the production process to be avoided. The described control of suction device 99 also enables a reduction in makeready time spent on the decorator, e.g. following a change in format of the hollow bodies 01 to be printed.

While a preferred embodiment of device for printing on hollow bodies, in accordance with the present invention, has been set forth fully and completely hereinabove, it will be apparent to one of skill in the art that various changes can be made thereto, without departing from the true spirit and scope of the present invention, which is accordingly to be limited only the appended claims.

The invention claimed is:

1. A device for printing on hollow bodies, comprising:
a segmented wheel;
an apparatus for sequentially feeding the hollow bodies to a circumference of the segmented wheel, the apparatus having at least a conveyor wheel and a mandrel wheel, wherein the conveyor wheel, the mandrel wheel, and thereafter the segmented wheel are arranged in a direction of transport of the hollow bodies;
a plurality of carrier elements arranged on a circumference of the conveyor wheel;
a plurality of holding devices arranged on a circumference of the mandrel wheel, each holding device being adapted for receiving one hollow body at a time to be printed on in cooperation with the segmented wheel;
a suction device on the conveyor wheel, the suction device being usable for applying suction to each respective hollow body to be fed to the segmented wheel;
a suction pump for the suction device, the suction pump being switched on and switched off by a central control unit based on an angular position of the conveyor wheel, and wherein, when the suction pump is switched on, it generates a vacuum, whereby, a hollow body, that is arranged at one of the plurality of carrier elements on the conveyor wheel and that is to be conveyed by the conveyor wheel to the mandrel wheel, is held at the one of the plurality of carrier elements on the conveyor wheel by the vacuum, within an angular range of the rotating conveyor wheel; and
a drive of the conveyor wheel, the drive of the conveyor wheel being configured as a closed-loop position controlled motorized direct drive, and wherein an angular range within which a hollow body to be conveyed by the conveyor wheel to the mandrel wheel is held at one of the plurality of carrier elements arranged on the circumference of the conveyor wheel and wherein an angular range at which a hollow body to be conveyed by the conveyor wheel to the mandrel wheel is held on the circumference of the conveyor wheel and is transferred by the conveyor wheel to the mandrel wheel is adjusted in increments of 0.01 mm or less.

2. The device according to claim 1, wherein the conveyor wheel has at least one suction opening on its circumference, in a region of at least one of the plurality of carrier elements on the conveyor wheel, wherein an air flow generated by the switched-on suction pump generates, at the at least one suction opening, the vacuum by which a hollow body, to be conveyed by the conveyor wheel to the mandrel wheel, is held at one of the plurality of carrier elements arranged on the circumference of the conveyor wheel.

3. The device according to claim 1, one of wherein the angular range of the rotating conveyor wheel, within which a hollow body that is received by one of the plurality of carrier elements of the conveyor wheel and that is to be conveyed by the conveyor wheel to the mandrel wheel, is held by the vacuum at the one of the plurality of carrier element of the conveyor wheel is less than 180°, and wherein the angular range of the rotating conveyor wheel is determined by one of the angular position of the conveyor wheel at which the suction pump is switched on and the angular position of the conveyor wheel at which the suction pump is switched off.

4. The device according to claim 1, wherein, in the periphery of the conveyor wheel, a blower air device is arranged, whereby the blower air device assists in the receipt of a hollow body at one of the plurality of carrier elements of the conveyor wheel, in that the blower air device emits at least one blast of air at the hollow body, in a direction of the conveyor wheel (76), based on an angular position of the conveyor wheel.

5. The device according to claim 1, wherein the suction pump is switched on both while the conveyor wheel is rotating and while the conveyor wheel is stationary.

6. The device according to claim 1, wherein the central control unit is configured as a control console associated with the device for printing on hollow bodies.

7. The device according to claim 1, wherein the mandrel wheel and the conveyor wheel are each driven separately from a drive of the segmented wheel, and each by its own dedicated drive.

8. The device according to claim 7, wherein one of the drive of the segmented wheel and the drive of the mandrel wheel are configured as a closed-loop position controlled motorized direct drive.

9. The device according to claim 7, wherein a rotational movement executed by the drive of the conveyor wheel is synchronized with a rotational movement executed by the drive of the mandrel wheel.

10. The device according to claim 1, wherein the suction pump is connected to the conveyor wheel via a coupling.

11. The device according to claim 10, wherein the coupling is switched from the central control unit.

12. The device according to claim 1, wherein the plurality of holding devices arranged on the circumference of the mandrel wheel and each adapted for receiving one hollow body at a time to be printed on in cooperation with the segmented wheel, are each configured as a clamping mandrel protruding from an end face of the mandrel wheel, concentrically to a circumferential line of the mandrel wheel.

13. The device according to claim 1, wherein the hollow bodies to be printed are each configured as a two-part can, a lateral surface of which is to be printed.

14. The device according to claim 1, wherein the device for printing on hollow bodies has a production speed ranging between 1,500 to 3,000 hollow bodies per minute.

* * * * *